(12) United States Patent
Chang et al.

(10) Patent No.: US 8,767,149 B2
(45) Date of Patent: Jul. 1, 2014

(54) LIQUID CRYSTAL DISPLAY

(75) Inventors: Hak Sun Chang, Yongin-si (KR); Yong Hwan Shin, Yongin-si (KR); Min-Sik Jung, Seoul (KR); Kyoung Ju Shin, Hwaseong-si (KR); Jun Woo Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 163 days.

(21) Appl. No.: 13/295,881

(22) Filed: Nov. 14, 2011

(65) Prior Publication Data

US 2012/0154723 A1      Jun. 21, 2012

(30) Foreign Application Priority Data

Dec. 20, 2010   (KR) .................. 10-2010-0130904

(51) Int. Cl.
*G02F 1/1333*      (2006.01)
(52) U.S. Cl.
USPC .......................................... 349/110; 349/106

(58) Field of Classification Search
None
See application file for complete search history.

(56) References Cited

U.S. PATENT DOCUMENTS

2010/0128214 A1*   5/2010   Lee et al. ....................... 349/130
2012/0002144 A1*   1/2012   Shoraku et al. ............... 349/103

* cited by examiner

*Primary Examiner* — Thanh-Nhan P Nguyen
(74) *Attorney, Agent, or Firm* — Innovation Counsel LLP

(57) ABSTRACT

Provided is a liquid crystal display including a first substrate and a second substrate facing each other, a plurality of pixel electrodes formed on the first substrate and each including a first subpixel electrode and a second subpixel electrode, a common electrode formed on the second substrate, a shielding member formed on the first substrate or the second substrate and overlapping a portion of the first subpixel electrode, an alignment layer formed on at least one of the plurality of pixel electrodes and the common electrode and subjected to photo-alignment, and a liquid crystal layer interposed between the first substrate and the second substrate.

29 Claims, 24 Drawing Sheets

FIG.4
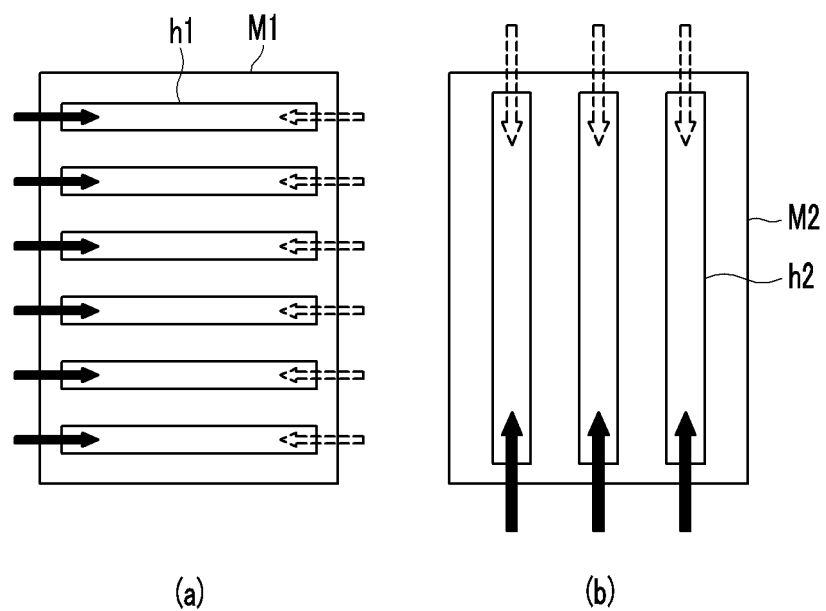
(a)          (b)

FIG.5
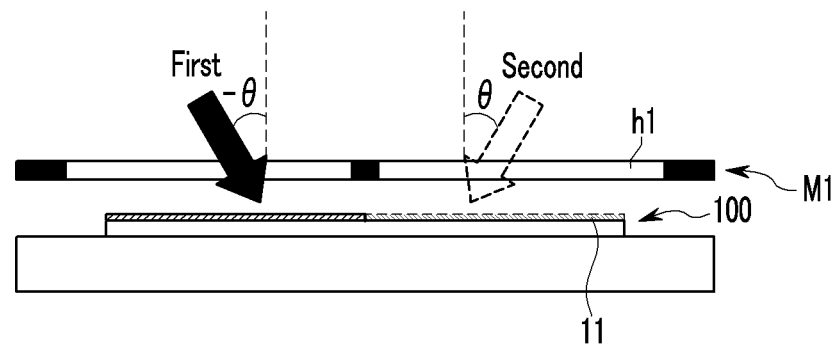
(a)
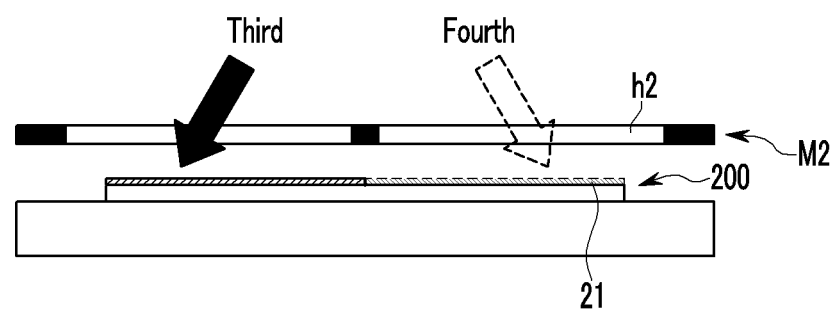
(b)

FIG.6
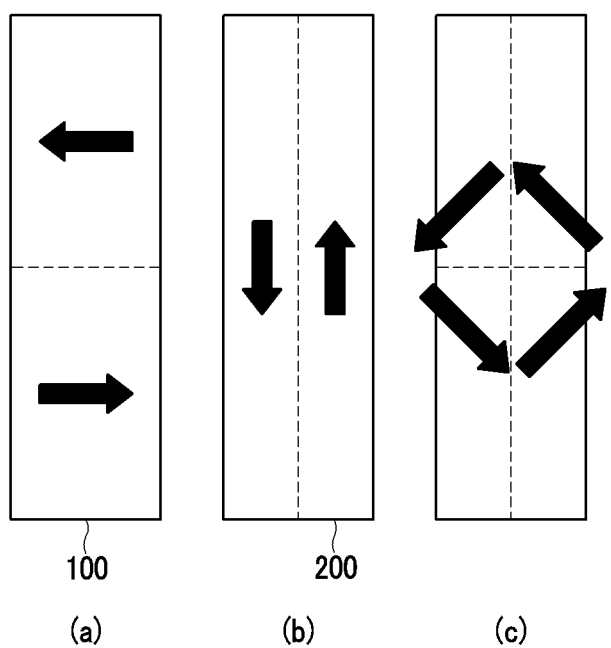
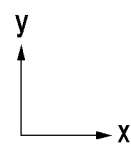

LIQUID CRYSTAL DISPLAY

CROSS-REFERENCE TO RELATED APPLICATION

This application claims priority to and the benefit of Korean Patent Application No. 10-2010-0130904 filed in the Korean Intellectual Property Office on Dec. 20, 2010, the entire contents of which are incorporated herein by reference.

BACKGROUND OF THE INVENTION (a) Field of the Invention

The present invention relates to liquid crystal displays.

(b) Description of the Related Art

A liquid crystal display, which is a type of flat panel display that is currently in widespread use, includes two substrates having field generating electrodes and a liquid crystal layer inserted therebetween. The electrodes generate an electric field in the liquid crystal layer by receiving voltages, thereby determining the orientation of liquid crystal molecules of the liquid crystal layer and controlling the polarization of incident light to display an image.

Among liquid crystal displays, a vertical alignment (VA) mode liquid crystal display in which the longitudinal axes of liquid crystal molecules are aligned to be vertical to upper and lower display panels when no electric field is applied has come to prominence because it is easy to achieve a large contrast ratio and a wide reference viewing angle.

In order to realize a wide viewing angle in the vertical alignment (VA) mode liquid crystal display, a plurality of domains having different liquid crystal alignment directions may be formed in a single pixel.

As a way of forming a plurality of domains in a single pixel as in a VA mode liquid crystal display, there is a method of forming a cutout portion in a field generating electrode. According to this method, a plurality of domains may be formed by aligning liquid crystals in directions vertical to a fringe field. The fringe field is formed between the edge of the cutout portion and a field generating electrode facing the edge.

However, the above structure degrades an aperture ratio. Furthermore, while a liquid crystal located near the cutout portion can be easily aligned in the direction vertical to the fringe field, a liquid crystal located at a central portion spaced far apart from the cutout portion produces a random motion that may cause a slowdown in response speed and the formation of a reverse-direction domain. These side effects may generate momentary afterimages.

Photo-alignment method is another way of forming a plurality of domains in a single pixel. The photo-alignment method allows control of the alignment direction and alignment angle of a liquid crystal by irradiating light onto an alignment layer. According to the photo-alignment method, it is possible to increase an aperture ratio since there is no need to form a cutout portion in a field generating electrode. The photo-alignment method also improves the response speed of the liquid crystal because of a pretilt angle generated at the time of photo-alignment.

Since portions in which the alignment directions of the liquid crystal are different are present at the boundaries between different domains, textures may be generated in those regions. The textures impair transmittance and images on those regions may appear blurry, thereby degrading display characteristics.

Meanwhile, a luminance level for each gray level of a gamma curve with respect to each of red (R), green (G) and blue (B) is different, and a yellowish effect may occur at an intermediate gray level.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display having advantages of improved visibility and reduced yellowish effect.

An exemplary embodiment of the present invention provides a liquid crystal display, including: a first substrate and a second substrate facing each other; a plurality of pixel electrodes formed on the first substrate and each including a first subpixel electrode and a second subpixel electrode; a common electrode formed on the second substrate; a shielding member formed on the first substrate or the second substrate and overlapping a portion of the first subpixel electrode; an alignment layer formed on at least one of the plurality of pixel electrodes and the common electrode and subjected to photo-alignment; and a liquid crystal layer interposed between the first substrate and the second substrate, wherein the first subpixel electrode is formed to be supplied with a first data voltage, and the second subpixel electrode is formed to be supplied with a second data voltage smaller than the first data voltage.

The shielding member may include a first shielding member formed substantially along a transverse base line of the first subpixel electrode, wherein the transverse base line approximately divides the first subpixel electrode into two parts.

The shielding member may further include a second shielding member formed along at least one of a left edge and a right edge of the first subpixel electrode.

The liquid crystal layer may include a first liquid crystal layer positioned between the first subpixel electrode and the common electrode, and the first liquid crystal layer may include four domains aligned in an upper left direction, a lower left direction, an upper right direction and a lower right direction.

The first subpixel electrode may be divided into four regions of an upper left region, an upper right region, a lower right region and a lower left region by the transverse base line and a longitudinal base line, and the four regions may correspond to the four domains, respectively.

A transverse domain boundary texture (DBT) may be generated in the vicinity of the transverse base line of the first subpixel electrode, and a longitudinal DBT may be generated in the vicinity of a longitudinal base line of the first subpixel electrode.

The first shielding member may cover the transverse DBT.

Upper and lower fringe field textures (FFT) may be generated in the vicinity of an upper edge and a lower edge of the first subpixel electrode, respectively, and left and right FFTs may be generated in the vicinity of a left edge and a right edge of the first subpixel electrode, respectively.

The second shielding member may cover at least one FFT of the left FFT and the right FFT.

The second shielding member may be formed in at least one domain of the four domains.

When an electric field is formed between the first subpixel electrode and the common electrode, an alignment direction of the first liquid crystal layer at an edge of the first subpixel electrode within the at least one domain by the electric field may be different from a liquid crystal alignment direction of the first domain.

The second shielding member overlapping the first subpixel electrode of a first pixel electrode, which is one of the plurality of pixel electrodes, may be formed in a first domain of the four domains, and the second shielding member overlapping the first subpixel electrode of a second pixel electrode, which is another one of the plurality of pixel electrodes, may be formed within the first domain and a second domain among the four domains.

When an electric field is formed between the first subpixel electrode and the common electrode, the alignment directions of the first liquid crystal layer at an edge of the first sub-pixel electrode within the first domain and the second domain by the electric field may be different from liquid crystal alignment directions of the first domain and the second domain.

The first domain and the second domain may have no planes opposing each other.

Each of the plurality of pixel electrodes may correspond to any one of red (R), green (G) and blue (B), and the second pixel electrode may correspond to blue.

The plurality of domains may be formed by irradiating light upon to the alignment layer in different directions.

Each of the plurality of pixel electrodes may correspond to any one of red, green and blue, and the shielding member overlapping the pixel electrode corresponding to blue may have a greater area than the shielding members overlapping the pixel electrodes corresponding to red and green.

The first subpixel electrode and the second subpixel electrode may be separated from each other by a gap.

The second subpixel electrode may be positioned above and below the first subpixel electrode, with the first subpixel electrode as a center.

The second subpixel electrode may surround the first subpixel electrode.

The liquid crystal display may further include: a first thin film transistor connected to the first subpixel electrode; a second thin film transistor connected to the second subpixel electrode; a gate line connected to the first thin film transistor and the second thin film transistor; and a data line intersecting the gate line, wherein the shielding member may be formed on the same layer as the gate line or the data line.

The liquid crystal display may further include a storage electrode line formed on the same layer as the gate line, wherein the shielding member may be connected to the storage electrode line.

The liquid crystal display may further include a light blocking member formed on at least one of the first substrate and the second substrate, wherein the shielding member may be formed on the same layer as the light blocking member.

The alignment layer may include a first alignment layer formed on the first substrate and a second alignment layer formed on the second substrate, the first alignment layer may include a first portion onto which light is irradiated in a first direction, and a second portion onto which light is irradiated in a second direction opposite to the first direction, and the second alignment layer may include a third portion onto which light is irradiated in a third direction intersecting the first direction, and a fourth portion onto which light is irradiated in a fourth direction opposite to the third direction.

Another exemplary embodiment of the present invention provides a liquid crystal display, including: a pixel electrode including first and second subpixel electrodes; a common electrode facing the pixel electrode; a first liquid crystal layer interposed between the first subpixel electrode and the common electrode and including a plurality of domains aligned in an upper left direction, a lower left direction, an upper right direction and a lower right direction; a second liquid crystal layer interposed between the second subpixel electrode and the common electrode; and a shielding member formed under the pixel electrode or the common electrode and overlapping the first subpixel electrode, wherein the first subpixel electrode is formed to be supplied with a first data voltage, and the second subpixel electrode is formed to be supplied with a second data voltage smaller than the first data voltage.

The first subpixel electrode may be divided into upper left, upper right, lower right and lower left regions, and the plurality of domains may be formed in a lower left direction in the upper left region, an upper left direction in the upper right region, an upper right direction in the lower right region, and a lower right direction in the lower left region.

The shielding member may include: a first shielding member overlapping a boundary between the upper left region and the lower left region and a boundary between the upper right region and the lower right region; a second shielding member formed at a left side of the upper left region; and a third shielding member formed at a right side of the lower right region.

The pixel electrode may be formed to correspond to one color filter of a red filter, a green filter and a blue filter, and an area of the shielding member may be determined according to the color filter corresponding to the pixel electrode.

An area of the shielding member of the pixel electrode that corresponds to the blue filter may be greater than an area of the shielding member of the pixel electrode corresponding to the green filter or the red filter.

According to the exemplary embodiments of the present invention, the liquid crystal display capable of improving lateral visibility and preventing a yellowish effect can be provided.

BRIEF DESCRIPTION OF THE DRAWINGS

FIG. 4A and FIG. 4B are schematic diagrams showing two masks used for photo-alignment, FIG. 5A and FIG. 5B are schematic diagrams illustrating a method of irradiating light by using the masks of FIG. 4.

FIG. 6A, FIG. 6B and FIG. 6C are schematic diagrams illustrating alignment directions of liquid crystal molecules formed by a photo-alignment method.

DETAILED DESCRIPTION OF THE EMBODIMENTS

Figure 1:
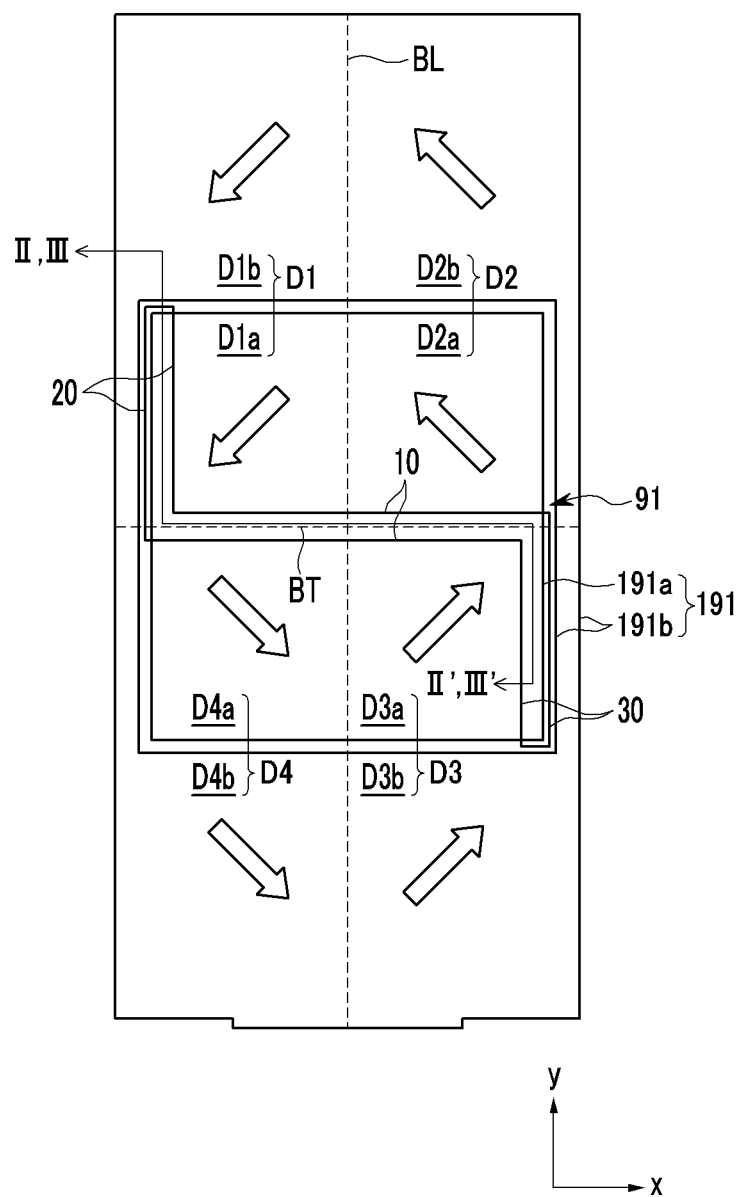
FIG. 1 is a layout view illustrating only a pixel electrode and a shielding member in a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display according to an exemplary embodiment of the present invention will be described in detail with reference to FIG. 1 and FIG. 2.

Figure 2:
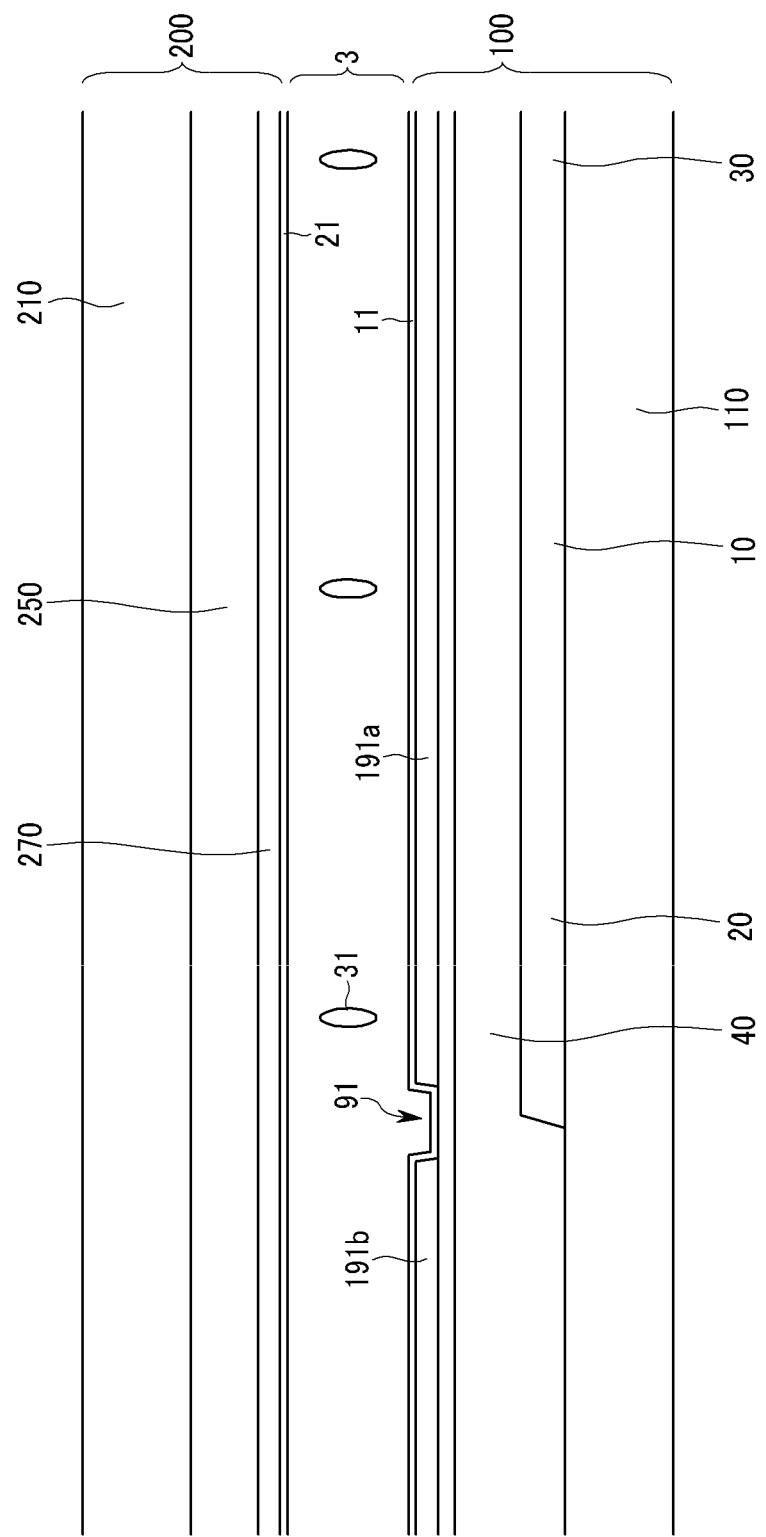
FIG. 2 is a cross-sectional view taken along line II-IF of the liquid crystal display of FIG. 1.

FIG. 1 is a layout view illustrating only a pixel electrode and a shielding member according to an exemplary embodiment of the present invention, and FIG. 2 is a cross-sectional view taken along line II-II' of the liquid crystal display of FIG. 1.

Referring to FIG. 1 and FIG. 2, the liquid crystal display includes a lower display panel 100 and an upper display panel 200 facing each other, and a liquid crystal layer 3 inserted therebetween.

First, the lower display panel 100 will be described.

The lower display panel 100 includes a first substrate 110, and shielding members 10, 20 and 30 are formed on the first substrate 110. An insulating layer 40 is formed on the shielding members 10, 20, and 30, a pixel electrode 191 is formed on the insulating layer 40, and an alignment layer 11 is formed on the pixel electrode 191.

The pixel electrode 191 includes first and second subpixel electrodes 191a and 191b separated from each other.

The pixel electrode 191 has a rectangular shape elongated in a y direction (see the coordinates in FIG. 1), and the first subpixel electrode 191a and the second subpixel electrode 191b are separated from each other with a gap 91 therebetween. The first subpixel electrode 191a has a quadrangular shape, and the second subpixel electrode 191b surrounds the first subpixel electrode 191a with the gap 91 therebetween. The gap 91 between the first subpixel electrode 191a and the second subpixel electrode 191b has a quadrangular band/frame shape.

The pixel electrode 191 is divided into four quadrants D1, D2, D3 and D4 of upper left, upper right, lower right and lower left regions by a transverse base line BT and a longitudinal base line BL. The quadrants D1 to D4 are divided by using the transverse base line BT and the longitudinal base line BL of the pixel electrode 191 as border lines therebetween, and have substantially the same size.

The first subpixel electrode 191a and the second subpixel electrode 191b are formed to be supplied with different data voltages. When voltage applied to the first subpixel electrode 191a is referred to as a first data voltage and voltage applied to the second subpixel electrode 191b is referred to as a second data voltage, the first data voltage is greater than the second data voltage. Accordingly, in the case of a low gray level, only the first subpixel electrode 191a contributes to luminance.

The shielding members 10, 20, and 30 include a first shielding member 10, a second shielding member 20, and a third shielding member 30. The shielding members 10, 20, and 30 overlap the first subpixel electrode 191a and the gap 91. The first shielding member 10 is formed along the transverse base line BT of the pixel electrode 191. The second and third shielding members 20 and 30 are formed in a direction intersecting the direction in which the first shielding member 10 is formed. For example, when the first shielding member 10 is formed in a horizontal direction, the second and third shielding members 20 and 30 extend in a y-direction. The second shielding member 20 is formed on a left edge within the upper left region D1a of the first subpixel electrode 191a, and the third shielding member 30 is formed on a right edge within the lower right region D3a of the first subpixel electrode 191a. The second and third shielding members 20 and 30 are formed on only a part of the edges of the first subpixel electrode 191a, and the locations at which the second and third shielding members 20 and 30 are formed are determined on the basis of a direction in which liquid crystals are aligned. A detailed description thereof will be made later.

In FIG. 1, the first shielding member 10, the second shielding member 20 and the third shielding member 30 are connected with each other. However, the first shielding member 10, the second shielding member 20 and the third shielding member 30 may be separated from each other.

Although not shown in FIG. 1 and FIG. 2, a gate line and a data line intersecting the gate line are formed on the first substrate 110 of the liquid crystal display. The shielding members 10, 20, and 30 may be formed on the same layer as the gate line. Alternatively, the shielding members 10, 20, and 30 may be formed on the same layer as the data line. Alternatively, the shielding members 10, 20, and 30 may be formed by being extended from a storage electrode line.

Hereinafter, the upper display panel 200 will be described.

The upper display panel 200 includes a second substrate 210, an overcoat layer 250 that is formed on the second substrate 210, a common electrode 270 that is formed on the overcoat layer 250, and an alignment layer 21 that is formed on the common electrode 270.

The liquid crystal layer 3 has negative dielectric anisotropy and is vertically aligned. Polarizers (not shown) may be attached to the outer surfaces of the substrates 110 and 210, respectively, and the polarization axes of the polarizers may be at a right angle to each other while making an approximately 45 degree-angle with respect to the x- and y-directions. "The x- and y-directions are indicated in the coordinates shown in FIG. 1.

When no electric field is applied to the liquid crystal layer 3, that is, when there is no voltage difference between the pixel electrode 191 and the common electrode 270, liquid crystal molecules 31 may be vertical to the surfaces of the alignment layers 11 and 21 or slightly inclined from the vertical state.

When a potential difference is generated between the pixel electrode 191 and the common electrode 270, an electric field, which is almost vertical to the surfaces of the display panels 100 and 200, is generated in the liquid crystal layer 3. Hereinafter, the pixel electrode 191 and the common electrode 270 are referred to as "field generating electrodes". Then, the liquid crystal molecules 31 of the liquid crystal layer 3 incline in response to the electric field so that their longitudinal axes are perpendicular with respect to the direction of the electric field. The polarization of light incident upon the liquid crystal layer 3 varies depending on the inclination angle of the liquid crystal molecules 31. The variation in the polarization translates to a variation in light transmittance during image display because of the polarizers.

The direction in which the liquid crystal molecules 31 are inclined depends on characteristics of the alignment layers 11 and 21. For example, the inclination direction of the liquid crystal molecules 31 may be determined by irradiating with ultraviolet rays (UV) having different polarization directions or irradiating the alignment layers 11 and 21 with UV rays from an angle.

A "first liquid crystal layer," as used herein, refers to the liquid crystal layer 3 that is interposed between the first subpixel electrode 191a and the common electrode 270. A "second liquid crystal layer" refers to the liquid crystal layer 3 that is interposed between the second subpixel electrode 191b and the common electrode 270, is referred to as a second liquid crystal layer. As shown by the arrows in FIG. 1, the liquid crystal molecules 31 of the first liquid crystal layer and the second liquid crystal layer are aligned in four different directions. The arrows indicate directions in which the liquid crystal molecules 31 are inclined. That is, the first liquid crystal layer and the second liquid crystal layer may each include four domains in which the liquid crystal is aligned in different alignment directions: upper left, lower left, upper right and lower right directions. The alignment directions of the liquid crystal are a lower left direction in the upper left region D1, an upper left direction in the upper right region D2, an upper right direction in the lower right region D3, and a lower right direction in the lower left region D4, respectively.

However, the directions in which the liquid crystal molecules 31 are inclined in those four regions D1 to D4 are not limited thereto, and there may be various other directions. Furthermore, the number of domains included in each of the first liquid crystal layer and the second liquid crystal layer is not limited to four, and may be more than or fewer than four.

Textures may be generated at the boundaries of the different domains due to the different alignment directions of the liquid crystal. A texture generated at the boundary between the different domains is called a domain boundary texture (DBT). Namely, in the first subpixel electrode 191a, a transverse DBT may be generated along the transverse base line BT and a longitudinal DBT may be generated along the longitudinal base line BL.

Because of the gap 91 between the first subpixel electrode 191a and the second subpixel electrode 191b and a gap between the pixel electrode 191 and an adjacent pixel electrode (not shown), a fringe field is generated between the common electrode 270 and the edges of the first subpixel electrode 191a and the second subpixel electrode 191b. Thus, the alignment directions of the liquid crystal may be determined by the fringe field, as well as by photo-alignment, at the edges of the first subpixel electrode 191a and the second subpixel electrode 191b. However, in the case in which the alignment direction of the liquid crystal determined by the photo-alignment is different from the alignment direction as determined by the fringe field, a texture may be generated at the edges of the first subpixel electrode 191a and the second subpixel electrode 191b. The textures generated at the edges of the first subpixel electrode 191a and the second subpixel electrode 191b are called fringe field textures (FFTs).

Portions where the FFT occur (hereinafter, "FFT portions") in FIG. 1 are as follows. In the first subpixel electrode 191a, the FFT portions are the left edge of an upper left region D1a, the upper edge of an upper right region D2a, the right edge of a lower right region D3a, and the lower edge of a lower left region D4a. In the second subpixel electrode 191b, the FFT portions are the lower edge of an upper left region D1b, the upper edge of an upper right region D2b, the upper edge of a lower right region D3b, and the lower edge of a lower left region D4a.

When the liquid crystal display is viewed, if the optical axis of the liquid crystal is viewed, it does not contribute to luminance. On the other hand, if the longitudinal axis of the liquid crystal is viewed, it contributes to luminance. When the liquid crystal display is viewed from the left or right side of the liquid crystal display, the optical axis or longitudinal axis of the liquid crystal may be viewed in each portion where a texture is generated.

When the liquid crystal display is viewed from the left or right side of the liquid crystal display, portions from which the longitudinal axis of the liquid crystal is viewed among portions where the texture is generated in FIG. 1 are as follows.

In the first subpixel electrode 191a, the portions where the longitudinal axis of the liquid crystal is viewed are the boundary between the upper left region D1a and the lower left region D4a, the boundary between the upper right region D2a and the lower right region D3a, the left side of the upper left region D1a, and the right side of the lower right region D3a. That is, in the first subpixel electrode 191a, the longitudinal axis of the liquid crystal is viewed in a transverse DBT among transverse and longitudinal DBTs and viewed in an FFT generated in the left and right edges among FFTs generated in the upper and lower edges and in the right and left edges.

The first shielding member 10 overlaps the boundary between the upper left region D1a and the lower left region D4a and the boundary between the upper right region D2a and lower right region D3a. That is, the first shielding member 10 overlaps the transverse base line BT of the first subpixel electrode 191a, and covers the transverse DBT of the first subpixel electrode 191a.

The second shielding member 20 is formed on the left side of the upper left region D1a, and the third shielding member 30 is formed on the right side of the lower right region D3a. That is, the second shielding member 20 covers a left FFT generated in the left edge of the first subpixel electrode 191a, and the third shielding member 30 covers a right FFT generated in the right edge of the first subpixel electrode 191a.

As described above, the shielding members 10, 20, and 30 cover a part of a plurality of textures generated in the first subpixel electrode 191a. In this case, a texture covered by the shielding members 10, 20, and 30 is a texture in which the longitudinal axis of the liquid crystal is viewed when the liquid crystal display is viewed from the left or right side of the liquid crystal display.

In such a manner, only a texture affecting lateral visibility among a plurality of textures generated in the first subpixel electrode 191a supplied with higher data voltage than the second subpixel electrode 191b may be covered with the shielding member. Thus, the left and right lateral gammas may be rendered similar to the front gamma at a low gray level, thereby improving the lateral visibility. Furthermore, since the covering of a part of the first subpixel electrode 191a with the shielding member may reduce the primary efficiency but increases the secondary or tertiary efficiency, transmittance is not significantly reduced.

Figure 3:
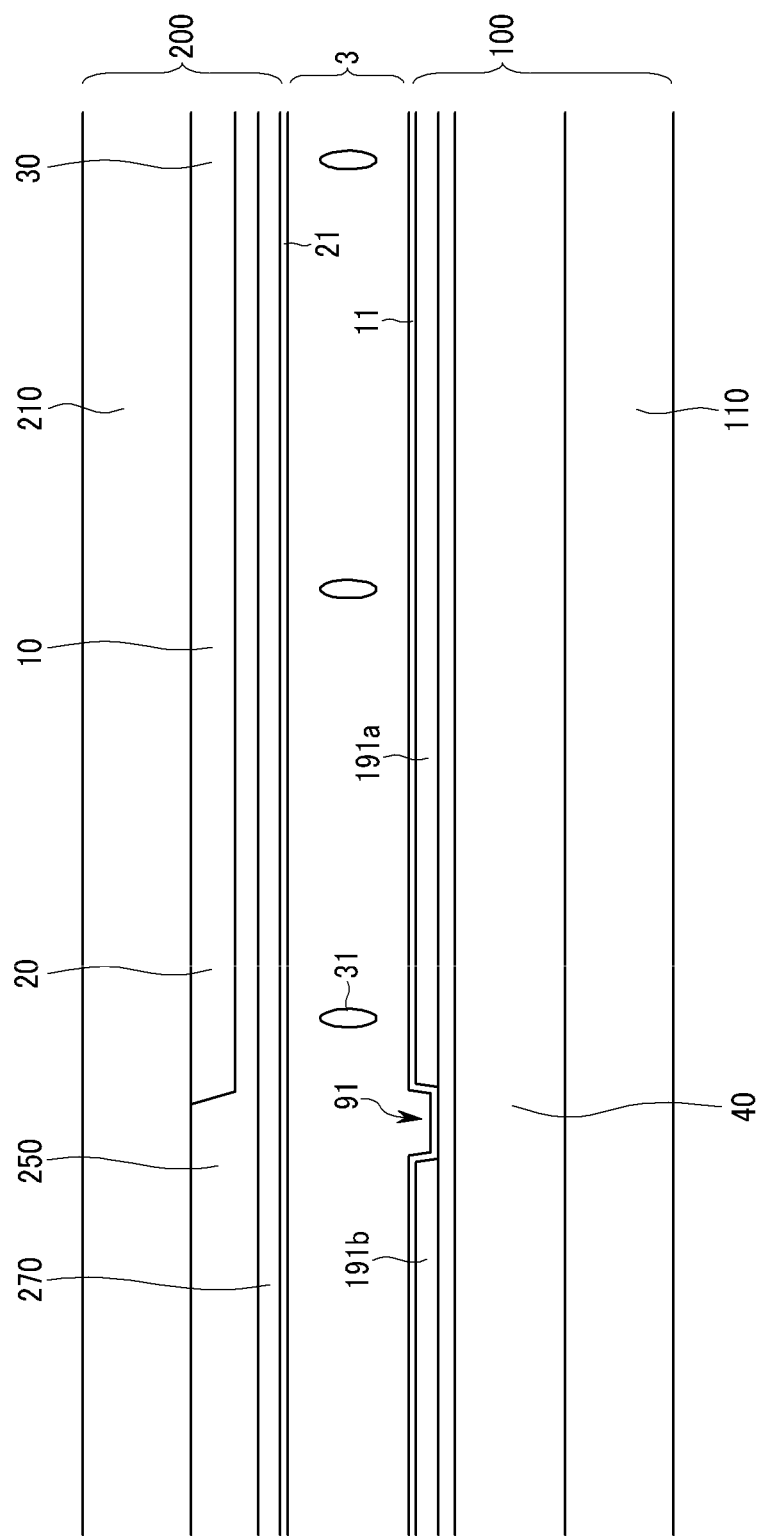
FIG. 3 is a cross-sectional view taken along line III-III' of the liquid crystal display of FIG. 1.

FIG. 3 illustrates a shielding member formed differently from that of FIG. 2. Like FIG. 2, FIG. 3 is a cross-sectional view taken along line III-III' of the liquid crystal display of FIG. 1.

Referring to FIG. 3, the shielding members 10, 20, and 30 are formed on the second substrate 210. FIG. 3 is substantially similar to FIG. 2, except that the shielding members 10, 20, and 30 are formed on the second substrate 210, not the first substrate 110.

Although not shown in FIG. 1 and FIG. 3, a light blocking member is formed on the second substrate 210 of the liquid crystal display. The shielding members 10, 20, and 30 may be formed on the same layer as the light blocking member. In this case, the shielding members 10, 20, and 30 may be formed by extending the light blocking member. Alternatively, the shielding members 10, 20, and 30 may be formed separately from the light blocking member.

Hereinafter, a method of forming a liquid crystal layer to include a plurality of domains will be described. The plurality of domains may be formed by a photo-alignment method of irradiating an alignment layer with light. The alignment layer may be formed of polyamicacid or polyimide including a photosensitive group such as cinamate, chalcon, coumarin or the like. The photo-alignment method is a method in which light is obliquely irradiated onto a vertical alignment layer such that photo-sensitive chains on the surface of the alignment layer are set to be laid along the direction in which the light is irradiated. In this case, a plurality of domains may be formed by irradiating light in a plurality of directions different from each another.

FIGS. 4A and 4B are schematic diagrams showing two masks used for photo-alignment, FIGS. 5A and 5B are schematic diagrams illustrating an irradiation method using the masks of FIG. 4, and FIGS. 6A, 6B and 6C are schematic diagrams showing a method of aligning liquid crystal molecules formed by the photo-alignment method.

Referring to FIGS. 4A and 4B, as masks used for photo-alignment, there are a first mask M1 having a plurality of openings h1 arranged in a direction which is parallel to a longer side of a substrate, and a second mask M2 having a plurality of openings h2 arranged in a direction which is perpendicular to the longer side of the substrate.

Referring to FIG. 4A and FIG. 5A, the first mask M1 is disposed on the lower display panel 100 with the alignment layer 11 applied thereon, and light such as UV light is irradiated thereto at an oblique angle, thereby performing a first exposure. An "oblique" angle, as used herein, forms a non=zero angle with respect to an axis that is orthogonal to the irradiated surface. In this case, the emission wavelength of the UV light is in the range of 10 nm to 400 nm, and may be preferably in the range of 280 nm to 340 nm. The emission energy of the light may be in the range of 1 mJ to 5,000 mJ. The emission energy and emission wavelength of the light may be affected by a material of the alignment layer 11. In the case in which the alignment layer is formed of polyamicacid or polyimide including a photosensitive group such as cinamate, chalcon, coumarin or the like, the emission energy of the light may be 50 mJ or less.

Linearly polarized ultraviolet (LPUV) light or partially polarized light may be used for irradiation. The LPUV is irradiated onto the surface of the alignment layer at an oblique angle, thereby inducing the same effect as if the surface of an alignment layer is rubbed in a predetermined direction. A method of obliquely irradiating the LPUV light onto the surface of the alignment layer surface may be achieved by sloping the alignment layer or sloping an LPUV irradiating device. The irradiation slope may be in the range of 0 degrees to 90 degrees. Preferably, the irradiation slope may range from 20 degrees to 70 degrees. Thereafter, light such as UV is irradiated at an oblique angle in an opposite direction to a direction in which the first exposure is carried out, thereby performing a second exposure.

In this case, light irradiation is performed while moving in a direction parallel to the longitudinal axis of the openings h1 of the first mask M1, or in the i-direction in reference to the coordinates shown in FIGS. 4A and 4B (i.e., in the direction of the arrows in FIG. 4A). If the light irradiation is not performed along the i-direction to which the longitudinal axis of the opening h1 is parallel, light diffraction may lead to a reduction in an actually exposed region, as well as a reduction in a process margin with respect to a distance between the substrate and the mask and the angle of exposure.

In one embodiment, the light irradiation is performed such that the upper half of a pixel area is irradiated at an angle that is inclined at an angle $-\theta$ with respect to an axis that is orthogonal to the irradiated surface. The lower half of the pixel area is irradiated at an angle that is approximately $\theta$ with respect to the axis, thereby forming two regions having opposite inclination directions as shown in FIG. 6A.

Likewise, referring to FIG. 4B and FIG. 5B, the second mask M2 is disposed on the upper display panel 200 having the alignment layer 21 applied thereon, and light such as UV light is irradiated at an oblique angle, thereby performing a third exposure. For the second mask M2, irradiation is performed in the j-direction, or along the arrows shown in FIG. 4B. Light such as UV is obliquely irradiated from an opposite angle from that in which the third exposure is performed, thereby performing a fourth exposure.

In this case, the light irradiation is performed while moving in a direction parallel to the longitudinal axis of the opening h2 of the mask M2, that is, a vertical direction (i.e., an arrow direction) in FIG. 4B.

For example, the light irradiation may be performed such that the left half of a pixel area is irradiated at an angle that is inclined along the y-direction while the right half thereof is irradiated at an angle that is inclined in an opposite direction along the y-direction. Accordingly, two regions having opposite liquid crystal inclination directions may be formed as shown in FIG. 6B.

Irradiation at an oblique angle to the surface of the alignment layer has the same effect as the rubbing of the surface of the alignment layer in a predetermined direction. That is, since the surface of the alignment layer has an alignment direction varying with the light irradiation direction, a plurality of domains having different pretilt directions of liquid crystal molecules may be formed in a single pixel by dividing the single pixel into a plurality of regions and then performing a series of exposures using different masks M1, M2.

Referring to FIG. 6C, when the lower display panel 100 and the upper display panel 200 are attached together, four domains that are aligned in upper left, lower left, upper right and lower right directions by vector sums may be formed. For example, in the upper left region, the lower display panel 100 has an inclination direction along the x-axis and the upper display panel 200 has an inclination direction along the y-axis. Thus, a domain aligned in the lower left direction by a vector sum is formed in the upper left region.

In an exemplary embodiment of the present invention, four domains having different alignment directions may be formed in each subpixel by using the above photo-alignment method. In general, each subpixel electrode may form four domains, and the alignment directions of the liquid crystal may have alignment associated with circulation (right, left), concentration-divergence, concentration, divergence and the like.

In FIGS. 6A, 6B and 6C, an x-axial direction represents a direction in which light is irradiated onto the lower half of the pixel area of the lower display panel 100 and a y-axial direction represents a direction in which light is irradiated onto the upper half of the pixel area of the upper display panel 200. However, these directions are used by way of example and do not limit a photo-alignment method. As another alignment method, an align-free method in which alignment is performed upon the lower display panel 100 by pretilt control in four directions may be used. Even in the case in which the upper display panel 200 is irradiated as shown in FIG. 6A and the lower display panel 100 is irradiated as shown in FIG. 6B, when the upper display panel 200 and the lower display panel 100 are combined, domains having liquid crystal alignment directions as shown in FIG. 6C may be formed.

The first alignment layer 11 of FIG. 2 or FIG. 3 includes a first portion that is irradiated in a first direction and a second portion that is irradiated in a second direction opposite to the first direction. The second alignment layer 21 includes a third portion that is irradiated in a third direction intersecting the first direction, and a fourth portion that is irradiated in a fourth direction opposite to the third direction. Here, if the first direction is an x-axial direction, the third direction is a y-axial direction.

Figure 7:
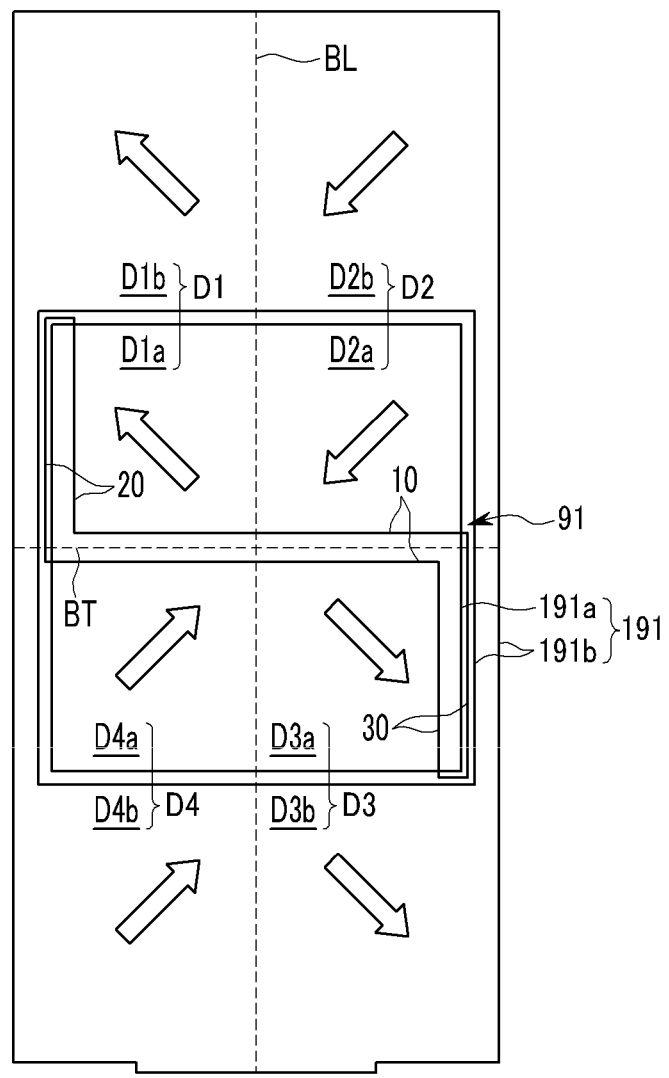
FIG. 7 to FIG. 9 are layout views each of which illustrates only a pixel electrode and a shielding member in a liquid crystal display having different liquid crystal alignment directions from those of FIG. 1.
Figure 8:
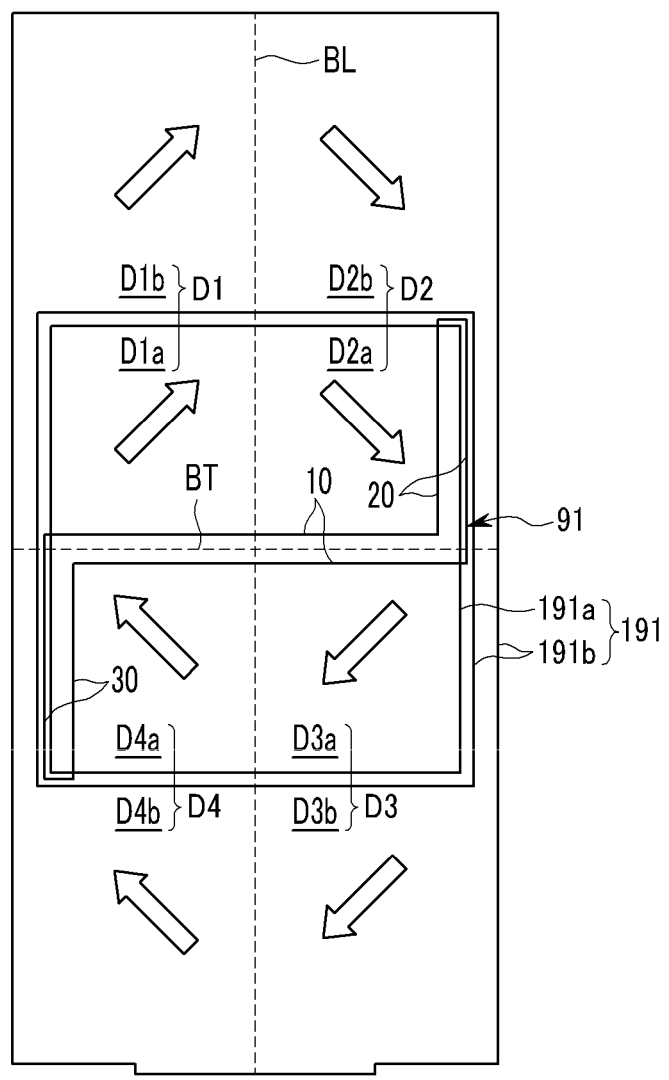
Figure 9:
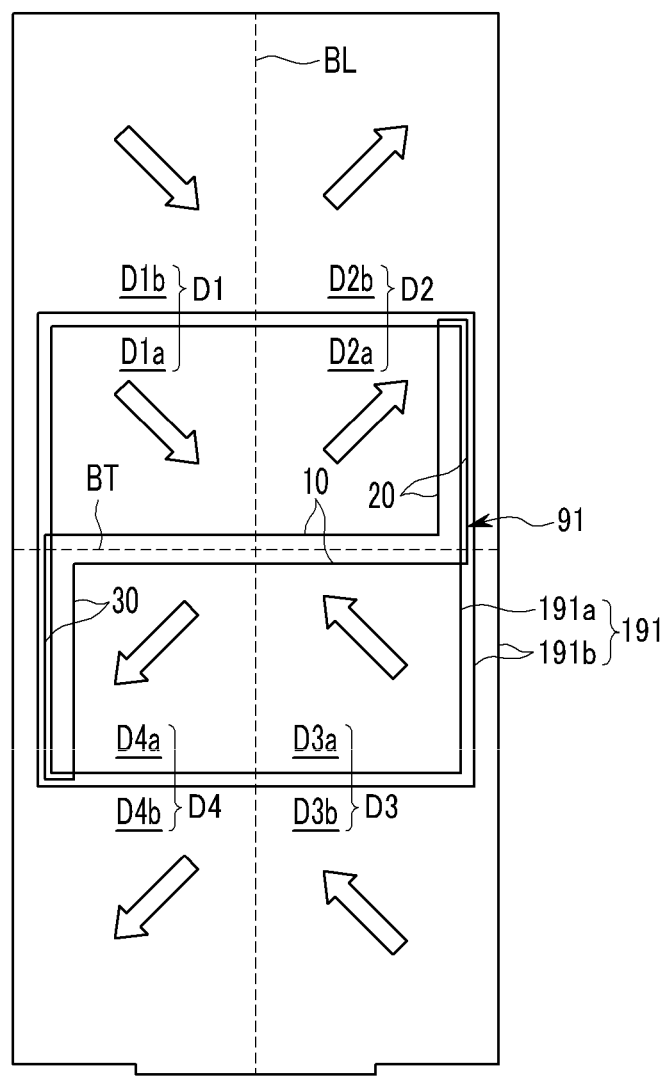

Liquid crystal alignment directions as shown in FIG. 7 to FIG. 9, different from that of FIG. 1, may be obtained through the combination of the first direction to the fourth direction.

FIG. 7 to FIG. 9 are layout views, and each of these figures illustrates a pixel electrode and a shielding member in a liquid crystal display having liquid crystal alignment directions different from those of FIG. 1.

Referring to FIG. 7, the liquid crystal alignment directions are an upper left direction in the upper left region D1, a lower left direction in the upper right region D2, a lower right direction in the lower right region D3, and an upper right direction in the lower left region D4.

When the liquid crystal display is viewed from the left or right side of the liquid crystal display, portions from which the longitudinal axis of the liquid crystal is shown among portions where textures are generated in FIG. 7 are the same as those in FIG. 1. That is, in the first subpixel electrode 191a, the portions where the longitudinal axis of the liquid crystal is viewed are the boundary between the upper left region D1a and the lower left region D4a, the boundary between the upper right region D2a and the lower right region D3a, the left side of the upper left region D1a, and the right side of the lower right region D3a.

Accordingly, the shapes of the shielding members 10, 20, and 30 are the same as those in FIG. 1.

Referring to FIG. 8, the liquid crystal alignment directions are an upper right direction in the upper left region D1, a lower right direction in the upper right region D2, a lower left direction in the lower right region D3, and an upper left direction in the lower left region D4.

When the liquid crystal display is viewed from the left or right side of the liquid crystal display, portions from which the longitudinal axis of the liquid crystal is viewed among portions where textures are generated in FIG. 8 are as follows.

In the first subpixel electrode 191a, the portions where the longitudinal axis of the liquid crystal is viewed are the boundary between the upper left region D1a and the lower left region D4a, the boundary between the upper right region D2a and the lower right region D3a, the right side of the upper right region D2a, and the left side of the lower left region D4a.

The first shielding member 10 is the same as that of FIG. 1, the second shielding member 20 is formed at the right side of the upper right region D2a, and the third shielding member 30 is formed at the left side of the lower left region D4a.

Referring to FIG. 9, the liquid crystal alignment directions are a lower right direction in the upper left region D1, an upper right direction in the upper right region D2, an upper left direction in the lower right region D3, and a lower left direction in the lower left region D4.

When the liquid crystal display is viewed from the left or right side of the liquid crystal display, the portions where the longitudinal axis of the liquid crystal is viewed among portions where textures are generated in FIG. 9 are the same as those of FIG. 8. That is, in the first subpixel electrode 191a, the portions where the longitudinal axis of the liquid crystal is viewed are the boundary between the upper left region D1a and the lower left region D4a, the boundary between the upper right region D2a and the lower right region D3a, the right side of the upper right region D2a, and the left side of the lower left region D4a. Accordingly, the shapes of the shielding members 10, 20, and 30 are the same as those of FIG. 8.

Figure 10:
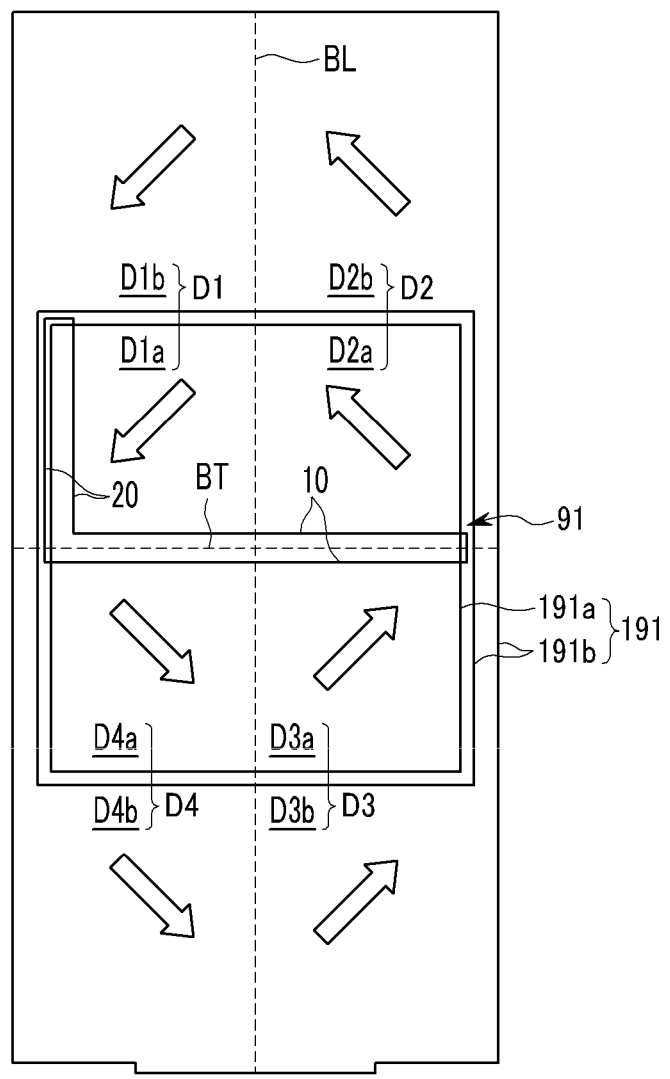
FIG. 10 is a layout view illustrating only a pixel electrode and a shielding member in a liquid crystal display according to another exemplary embodiment of the present invention.

FIG. 10 is a layout view illustrating only a pixel electrode and a shielding member in a liquid crystal display device according to another exemplary embodiment of the present invention.

Referring to FIG. 10, shielding members 10 and 20 include only a first shielding member 10 and a second shielding member 20. Unlike FIG. 1, the third shielding member 30 is not formed. When the liquid crystal display is viewed from the left or right side of the liquid crystal display, the right side of a lower right region D3a is a portion in which textures are generated, but is not covered with the shielding members 10 and 20. That is, the shielding members 10, 20 and 30 of FIG. 1 cover substantially all of the portion where the textures in which the longitudinal axis of the liquid crystal is viewed are generated, while the shielding members 10 and 20 of FIG. 10 cover a part of portions where the textures are generated.

Unlike FIG. 10, the second shielding member 20 may be formed on the right side of the lower right region D3a of the first subpixel electrode 191a, rather than being formed on the left side of an upper left region D1a.

To sum up FIG. 1 and FIG. 7 to FIG. 10, the first shielding member 10 is formed along the transverse base line (BT) of the first subpixel electrode 191a. For convenience of description, the second shielding member 20 and the third shielding member 30 are described separately; however, both of the second shielding member 20 and the third shielding member 30 may be considered to be a single second shielding member, distinguished from the first shielding member 10. In this case, the second shielding member is formed in at least one of the vicinity of the left edge of the first subpixel electrode 191a and the vicinity of the right edge thereof.

As the shielding member covers a portion of a plurality of textures generated in the first subpixel electrode, lateral visibility can be improved.

The area of the shielding member of the pixel electrode 191 of FIG. 1 is greater than that of the shielding member of the pixel electrode 191 of FIG. 10. Both of the pixel electrode 191 of FIG. 1 and the pixel electrode 191 of FIG. 10 may be pixel electrodes within a single liquid crystal display. The liquid crystal display has a plurality of pixel electrodes arranged in the form of a matrix. Each of the plurality of pixel electrodes may correspond to any one of red (R), green (G) and blue (B). Whether one pixel electrode of the plurality of pixel electrodes is in the form of the pixel electrode 191 of FIG. 1 or the pixel electrode 191 of FIG. 10 may be determined based on the color corresponding to the one pixel electrode.

The pixel electrode 191 of FIG. 1 may be a pixel electrode corresponding to blue, and the pixel electrode 191 of FIG. 10 may be a pixel electrode corresponding to red and/or green. That is, the area of a shielding member of the pixel electrode corresponding to blue may be formed to be larger than the area of a shielding member of the pixel electrode corresponding to red and green. For example, when the liquid crystal display is viewed from the left or right side of the liquid crystal display, in the case where there are N-number of portions where textures in which the longitudinal axis of the liquid crystal is viewed are generated (here, N is a natural number of 2 or greater), the shielding member of the pixel electrode corresponding to blue covers all the portions where N textures are generated, while the shielding member of the pixel electrode corresponding to red and green may cover only portions where N−1 textures are generated. As used herein, a liquid crystal display being viewed "from the left or right side" is intended to mean that the viewer looking forward does not result in his gaze being on any part of the liquid crystal display.

In this case, data voltage for each gray level of blue may be controlled to be identical to or different from data voltage for each gray level of red and/or green.

In the case where the data voltage for each gray level is not differentiated according to color, the transmittance of a pixel corresponding to blue may be reduced by controlling the area of a shielding member for each color.

In the case where the data voltage for each gray level is differentiated according to a color, the transmittance of a pixel corresponding to blue may be reduced by controlling the data voltage for each gray level according to a color, and also by controlling the area of a shielding member for each color.

As described above, since the transmittance of a pixel corresponding to blue can be reduced by controlling the data voltage for each gray level according to a color and/or controlling the area of the shielding member for each color, a yellowish effect at an intermediate gray level can be prevented. In this manner, visibility can be improved. Such a principle of improving visibility is also applicable to multi primary color (MPC) or the like.

Figure 11:
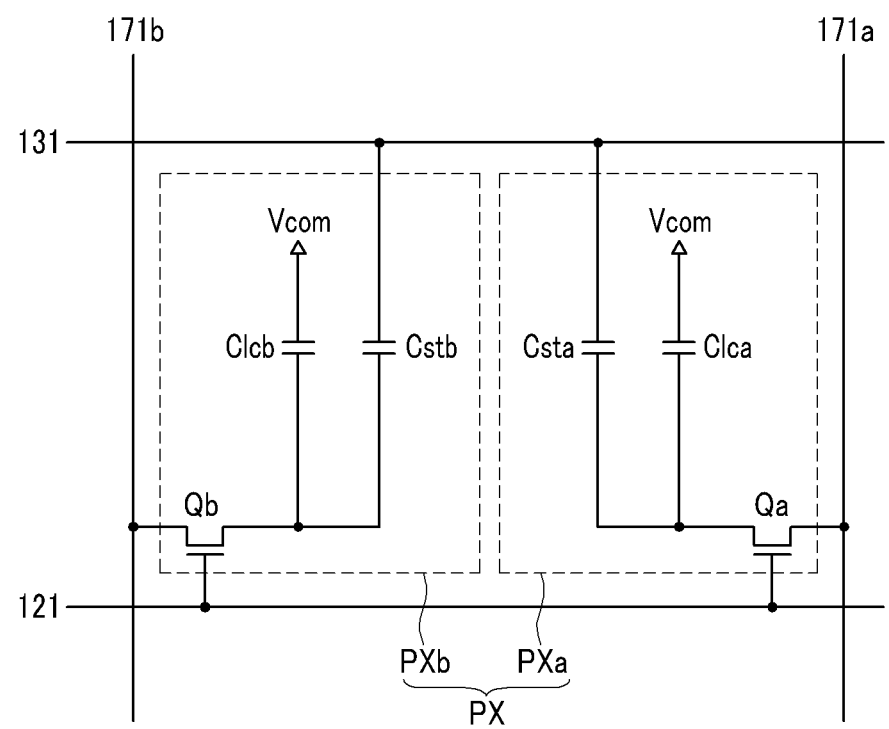
FIG. 11 is an equivalent circuit diagram with respect to a single pixel in a liquid crystal display according to yet another exemplary embodiment of the present invention.
Figure 12:
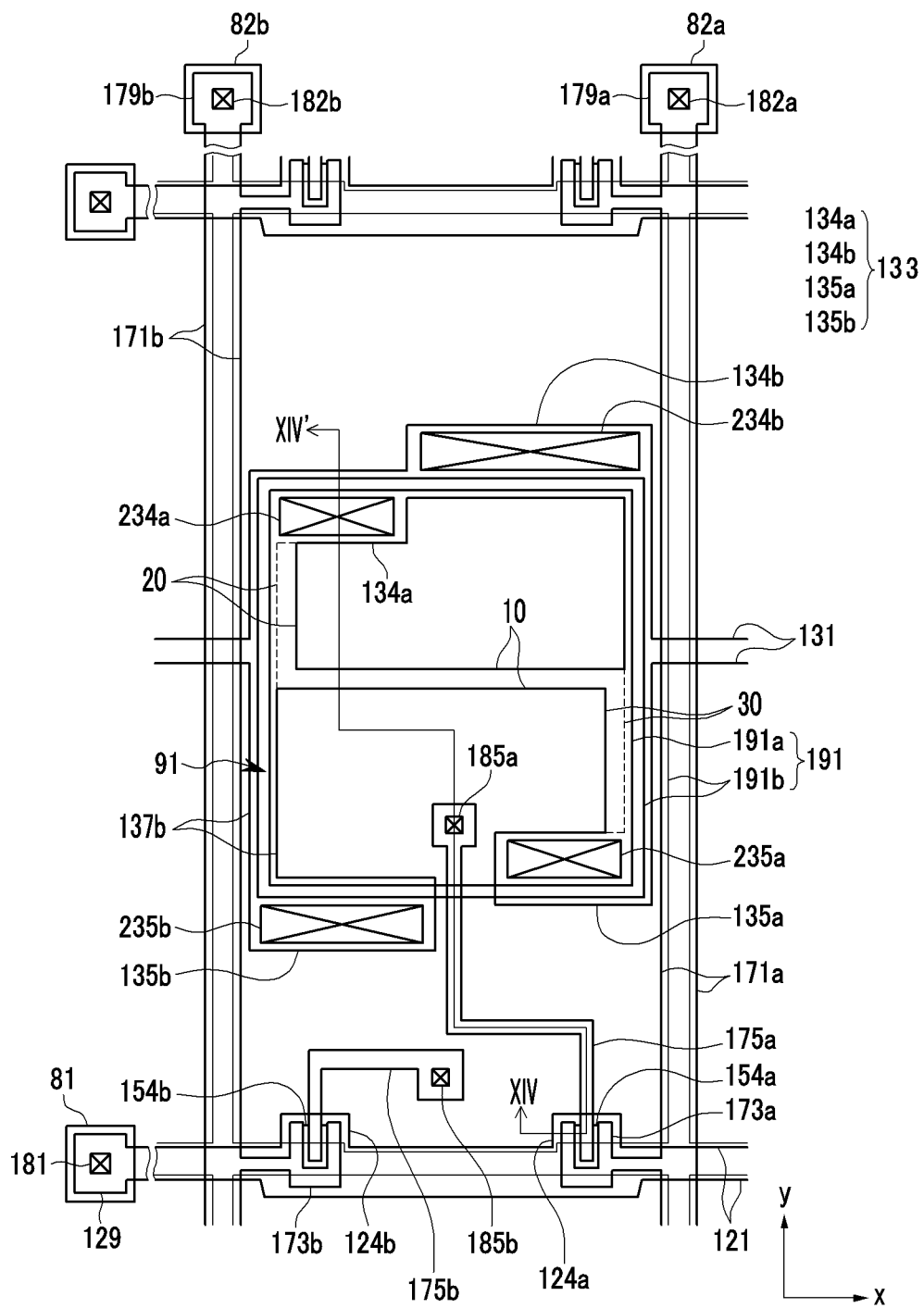
FIG. 12 is a layout view of a liquid crystal display according to an exemplary embodiment of the present invention.
Figure 13:
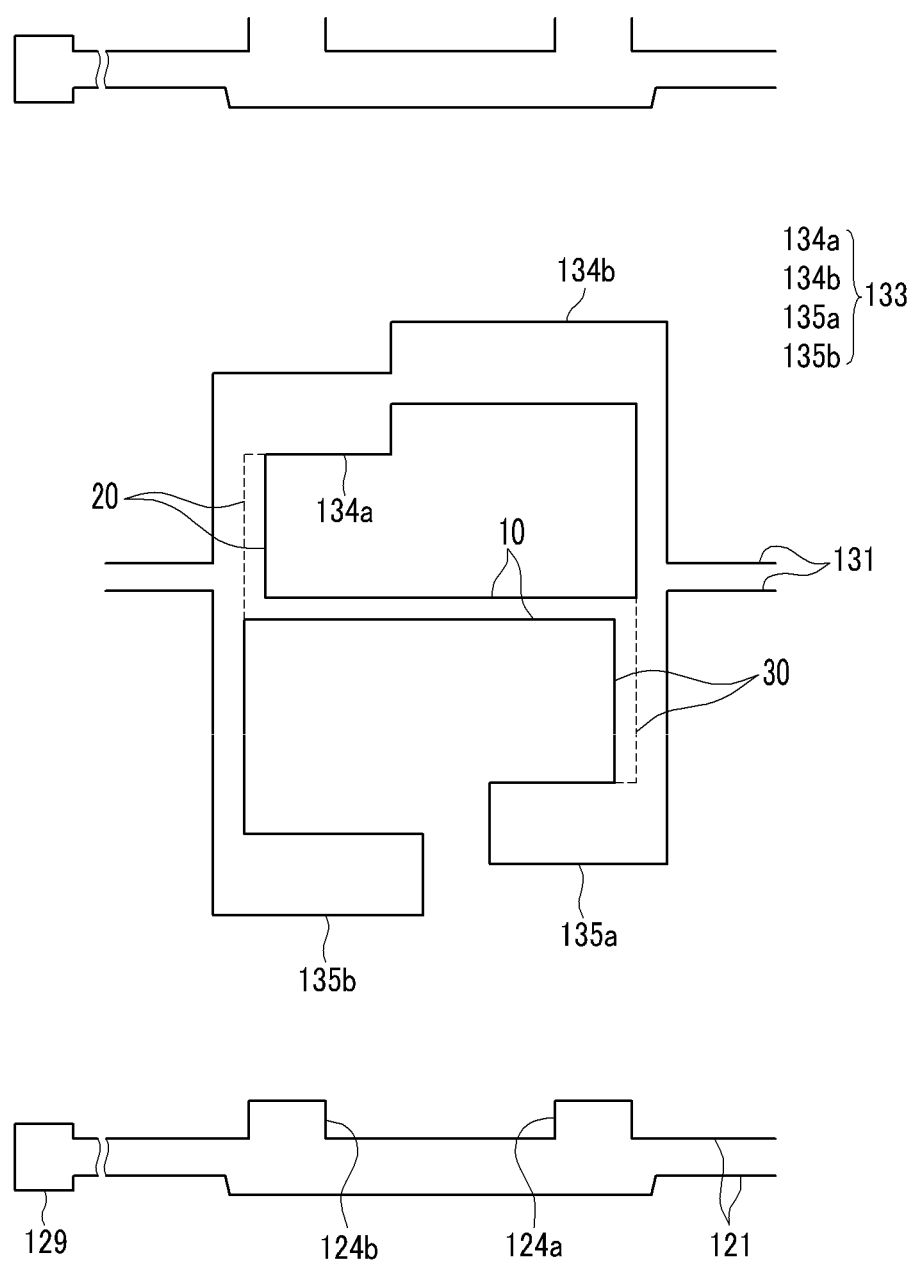
FIG. 13 is a layout view illustrating only a gate conductor part in the liquid crystal display of FIG. 12.
Figure 14:
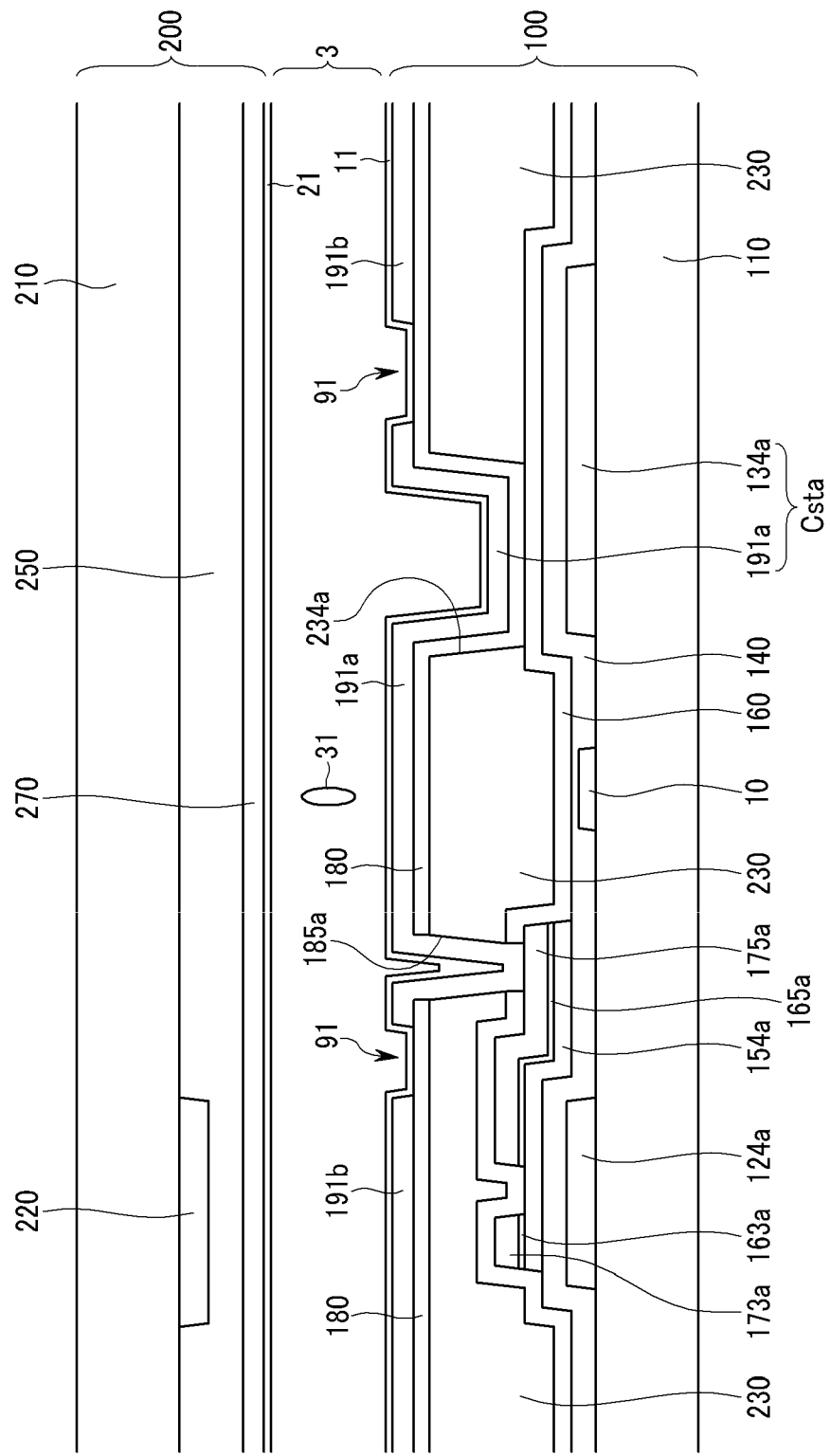
FIG. 14 is a cross-sectional view taken along line XIV-XIV' of the liquid crystal display of FIG. 12.

FIG. 11 is an equivalent circuit diagram illustrating a single pixel in a liquid crystal display according to yet another exemplary embodiment of the present invention, FIG. 12 is a layout view of a liquid crystal display according to yet another exemplary embodiment of the present invention, FIG. 13 is a layout view showing only a gate conductor part of the liquid crystal display of FIG. 12, and FIG. 14 is a cross-sectional view taken along line XIV-XIV' of the liquid crystal display of FIG. 12.

Referring to FIG. 11, each pixel PX includes a pair of subpixels PXa and PXb. As for each of the subpixel PXa and PXb, the subpixel PXa includes a switching element Qa connected to a gate line 121 and a corresponding data line 171a, a liquid crystal capacitor Clca connected to the switching element Qa, and a storage capacitor Csta connected to the switching element Qa and a storage electrode line 131, and the subpixel PXb includes a switching element Qb connected to the gate line 121 and a corresponding data line 171b, a liquid crystal capacitor Clcb connected to the switching element Qb, and a storage capacitor Cstb connected to the switching element Qb and the storage electrode line 131.

Each of the switching elements Qa and Qb is a three-terminal element including a control terminal, an input terminal and an output terminal. The control terminal is connected to the gate line 121, the input terminal is connected to a corresponding one of the data lines 171a and 171b, and the output terminal is connected to a corresponding one of the liquid crystal capacitors Clca and Clcb and a corresponding one of the storage capacitors Csta and Cstb.

The storage capacitors Csta and Cstb assisting with the liquid crystal capacitors Clca and Clcb are formed as the storage electrode line 131 and a pixel electrode (not shown) overlap each other with an insulator interposed therebetween. A fixed voltage such as a common voltage Vcom is applied to the storage electrode line 131. However, the storage capacitors Csta and Cstb may be formed as the pixel electrode overlaps a previous gate line, placed directly thereon, by the medium of an insulator.

Referring to FIG. 12 to FIG. 14, the liquid crystal display according to the present exemplary embodiment includes a lower display panel 100 and an upper display panel 200 facing each other, and a liquid crystal layer 3 interposed therebetween.

First, the lower display panel 100 will be described.

A gate conductor including a gate line 121 and a storage electrode line 131 is formed on a first substrate 110.

The gate line 121 extends in the x-direction, and transmits a gate signal. The gate line 121 includes first and second gate electrodes 124a and 124b extending therefrom (in the y-direction), and an end portion 129 having an enlarged width.

The storage electrode line 131 extends in the x-direction, and transmits a common voltage or the like. Each storage electrode line 131 is positioned between two gate lines 121, and includes a storage electrode 133 and shielding members 10, 20, and 30.

Referring to FIG. 12 and FIG. 13, the storage electrode 133 has a broken-band/frame shape having an upper surface, a lower surface, a left surface and a right surface around a cutout. The upper surface of the storage electrode 133 includes an extension portion 134a extending into the cutout, and an extension portion 134b extending away from the cutout. The extension portions 134a and 134b are connected to each other by the upper surface of the storage electrode 133. The lower surface of the storage electrode 133 also includes an extension portion 135b extending away from the cutout, and an extension portion 135a extending into the cutout. The extension portions 135a and 135b are not connected to each other by the lower surface. A portion of the lower surface of the band-shaped storage electrode 133 is removed to create a gap, and this gap is positioned between the extension portions 135a and 135b. Partly due to the extension portions 134a, 134b, 135a, 135b, the upper surface and lower surface of the storage electrode 133 are greater in width than the left surface and right surface. The storage electrode line 131 extends into and across the cutout, bridging the left surface to the right surface.

The shielding members 10, 20 and 30 of FIG. 12 and FIG. 13 are the same as the shielding members 10, 20 and 30 of FIG. 1 in terms of shape, and are formed by extending the storage electrode line 131.

A gate insulating layer 140 is formed on the gate line 121 and the storage electrode line 131.

A semiconductor stripe (not shown) is formed on the gate insulating layer 140. The semiconductor stripe extends chiefly in the y-direction, and includes first and second protruding portions 154a and 154b extending toward the first and second gate electrodes 124a and 124b.

An ohmic contact stripe (not shown), a first ohmic contact island 165a and a second ohmic contact island (not shown) are formed on the semiconductor stripe. The ohmic contact stripe has a first protrusion portion 163a and a second protrusion portion (not shown). The first protrusion portion 163a and the first ohmic contact island 165a face each other on the first protruding portion 154a of the semiconductor stripe, and the second protrusion portion and the second ohmic contact island face each other on the second protruding portion 154b of the semiconductor stripe.

First and second data lines 171a and 171b and first and second drain electrodes 175a and 175b are formed on the ohmic contact stripe and the gate insulating layer 140.

The first and second data lines 171a and 171b extend in the y-direction to intersect the gate line 121 and the storage electrode line 131 and transmit a data voltage. The first data line 171a includes a first source electrode 173a extending toward the first gate electrode 124a, and an end portion 179a having an enlarged width. The second data line 171b includes a second source electrode 173b extending toward the second gate electrode 124b, and an end portion 179b having an enlarged width. The first data line 171a and the second data line 171b are supplied with different voltages. The first data line 171a is supplied with a first data voltage, and the second data line 171b is supplied with a second data voltage lower than the first data voltage.

The first drain electrode 175a faces the first source electrode 173a as does the first gate electrode 124a, and the second drain electrode 175b faces the second source electrode 173b as does the second gate electrode 124b. The end portions of the first and second drain electrodes 175a and 175b are partially surrounded by the curved portions of the first and second source electrodes 173a and 173b, respectively.

The semiconductor stripe has substantially the same plane shape as the first and second data lines 171a and 171b and the first and second drain electrodes 175a and 175b, except for a channel region between the first source electrode 173a and the first drain electrode 175a and a channel region between the second source electrode 173b and the second drain electrode 175b.

The ohmic contact stripe is interposed between the semiconductor stripe and the first and second data lines 171a and 171b, and has substantially the same plane shape as the first and second data lines 171a and 171b. The first and second ohmic contact islands are interposed between the semiconductor stripe and the first and second drain electrodes 175a and 175b, and have substantially the same plane shape as the first and second drain electrodes 175a and 175b.

A blocking layer 160 made of an inorganic insulating material, such as silicon nitride (SiNx) or silicon oxide $SiO_2$, is formed on the first and second data lines 171a and 171b and the first and second drain electrodes 175a and 175b, and a color filter 230 is formed on the blocking layer 160.

The color filter 230 may include a red filter, a green filter, and a blue filter extending in a direction parallel to the first and second data lines 171a and 171b along the pixel columns of the pixel matrix. Alternatively, the red filter, the green filter and the blue filter may be alternately arranged with respect to each pixel.

The color filter 230 has a plurality of openings 234a, 234b, 235a and 235b. The openings 234a, 234b, 235a and 235b overlap the extension portions 134a, 134b, 135a and 135b of the storage electrode 133.

A passivation layer 180 is formed on the color filter 230. The passivation layer 180 may be made of an inorganic insulating material such as silicon nitride or silicon oxide. The passivation layer 180 may prevent the separation of the color filter 230 and prevent chemical solutions, such as an etch solution, from flowing into the color filter 230 in a subsequent process.

Contact holes 185a and 185b exposing the first and second drain electrodes 175a and 175b are formed in the passivation layer 180, the color filter 230 and the blocking layer 160. Contact holes 182a and 182b exposing the respective end portions 179a and 179b of the first and second data lines 171a and 171b are formed in the passivation layer 180 and the blocking layer 160. A contact hole 181 exposing the end portion 129 of the gate line 121 is formed in the passivation layer 180, the blocking layer 160 and the gate insulating layer 140.

A pixel electrode 191 and a plurality of contact assistants 81 and 82 are formed on the passivation layer 180.

The pixel electrode 191 includes a pair of first and second subpixel electrodes 191a and 191b separated from each other with a gap 91 positioned therebetween.

The gap 91 between the first subpixel electrode 191a and the second subpixel electrode 191b has a quadrangular band shape, and the quandrangular band-shaped storage electrode 133 described above overlaps the gap 91 and serves to prevent light leakage between the first subpixel electrode 191a and the second subpixel electrode 191b.

Furthermore, the shielding members 10, 20 and 30 of the storage electrode 133 serve as shielding members covering textures caused by photo-alignment. The description on this matter is the same as described above.

Also, the extension portions 134a, 135a, 134b and 135b of the storage electrode 133 overlap the first subpixel electrode 191a or the second subpixel electrode 191b to thereby form a storage capacitor Cst.

That is, the first subpixel electrode 191a overlaps the extension portions 134a and 135a (both of which extend into the cutout of the storage electrode 133) of the storage electrode 133 to thereby form a storage capacitor Csta. In this case, the openings 234a and 235a of the color filter 230 are located in the portion where the first subpixel electrode 191a overlaps the extension portions 134a and 135b of the storage electrode 133, thereby reducing the thickness of the insulator of the storage capacitor Csta is achieved, and thus increasing storage capacitance.

The second subpixel electrode 191b forms a storage capacitor Cstb by overlapping the extension portions 134b and 135b of the storage electrode 133. In this case, the openings 234b and 235b of the color filter 230 are located in the portion where the second subpixel electrode 191b overlaps the extension portions 134b and 135b of the storage electrode 133, thereby reducing the thickness of the storage capacitor Cstb and thus increasing storage capacitance.

The first gate electrode 124a, the first protruding portion 154a of the semiconductor stripe, the first source electrode 173a and the first drain electrode 175a form a first thin film transistor Qa, and the first thin film transistor Qa is connected to the first subpixel electrode 191a through the contact hole 185a. The second gate electrode 124b, the second protruding portion 154b of the semiconductor stripe, the second source electrode 173b and the second drain electrode 175b form a second thin film transistor Qb, and the second thin film transistor Qb is connected to the second subpixel electrode 191b through the contact hole 185b.

As described above, since the first subpixel electrode 191a and the second subpixel electrode 191b, constituting the single pixel electrode 191, are connected to the first thin film transistor Qa and the second thin film transistor Qb, respectively, the first and second subpixel electrodes 191a and 191b are supplied with separate data voltages through first and second data lines 171a and 171b. In some alternative embodiments, the first and second subpixel electrodes 191a and 191b may be supplied with separate data voltages at different times through a single data line.

When the voltages of the first subpixel electrode 191a and the second subpixel electrode 191b are different as described above, different voltages are applied to a first liquid crystal capacitor Clca formed between the first subpixel electrode 191a and the common electrode 270 and a second liquid crystal capacitor Clcb formed between the second subpixel electrode 191b and the common electrode 270. For this reason, angles at which liquid crystal molecules are inclined are different between the first subpixel and the second subpixel, and there occurs a difference in luminance between the two subpixels accordingly. Therefore, by appropriately adjusting the voltage of the first liquid crystal capacitor Clca and the voltage of the second liquid crystal capacitor Clcb, an image viewed from the side can be rendered as close as possible to an image viewed from the front, namely, a lateral gamma curve can be rendered as close as possible to a front gamma curve, so that lateral visibility can be improved.

The contact assistants 81 and 82 are connected to the end portion 129 of the gate line 121 and the end portion 179 of the data line 171 through the contact holes 181 and 182, respectively. The contact assistants 81 and 82 supplement adhesive properties between the end portion 129 of the gate line 121 or the end portion 179 of the data line 171 and an external device such as a drive IC, and protect the same.

Hereinafter, the upper display panel 200 will be described.

A plurality of light blocking members 220 are formed on a second substrate 210, an overcoat layer 250 is formed on the light blocking members 220, and a common electrode 270 is formed on the overcoat layer 250.

Alignment layers 11 and 21 are formed on the facing surfaces of the lower display panel 100 and the upper display panel 200, respectively. The alignment layers 11 and 21 are vertical alignment layers, and the surfaces of the alignment layers 11 and 21 have the end portion inclined in different directions by region.

The liquid crystal layer 3 is interposed between the lower display panel 100 and the upper display panel 200. The liquid crystal layer 3 includes a plurality of liquid crystal molecules 31 having negative dielectric anisotropy.

FIG. 13 and FIG. 14 illustrate the storage electrode including the shielding members 10, 20, and 30 as being formed on the same layer as the gate line by way of example, but the present invention is not limited thereto and the storage electrode may be formed on the same layer as the data line. Furthermore, as described above, the shielding members 10, 20, and 30 may be formed on the same layer as the light blocking member 220 of the upper display panel 200, rather than being formed on the same layer as the gate line or the data line. Also, in some cases, the light blocking member 220 may be formed on the lower display panel 100, and in this case, the shielding members may be also formed on the same layer as the light blocking member.

Figure 15:
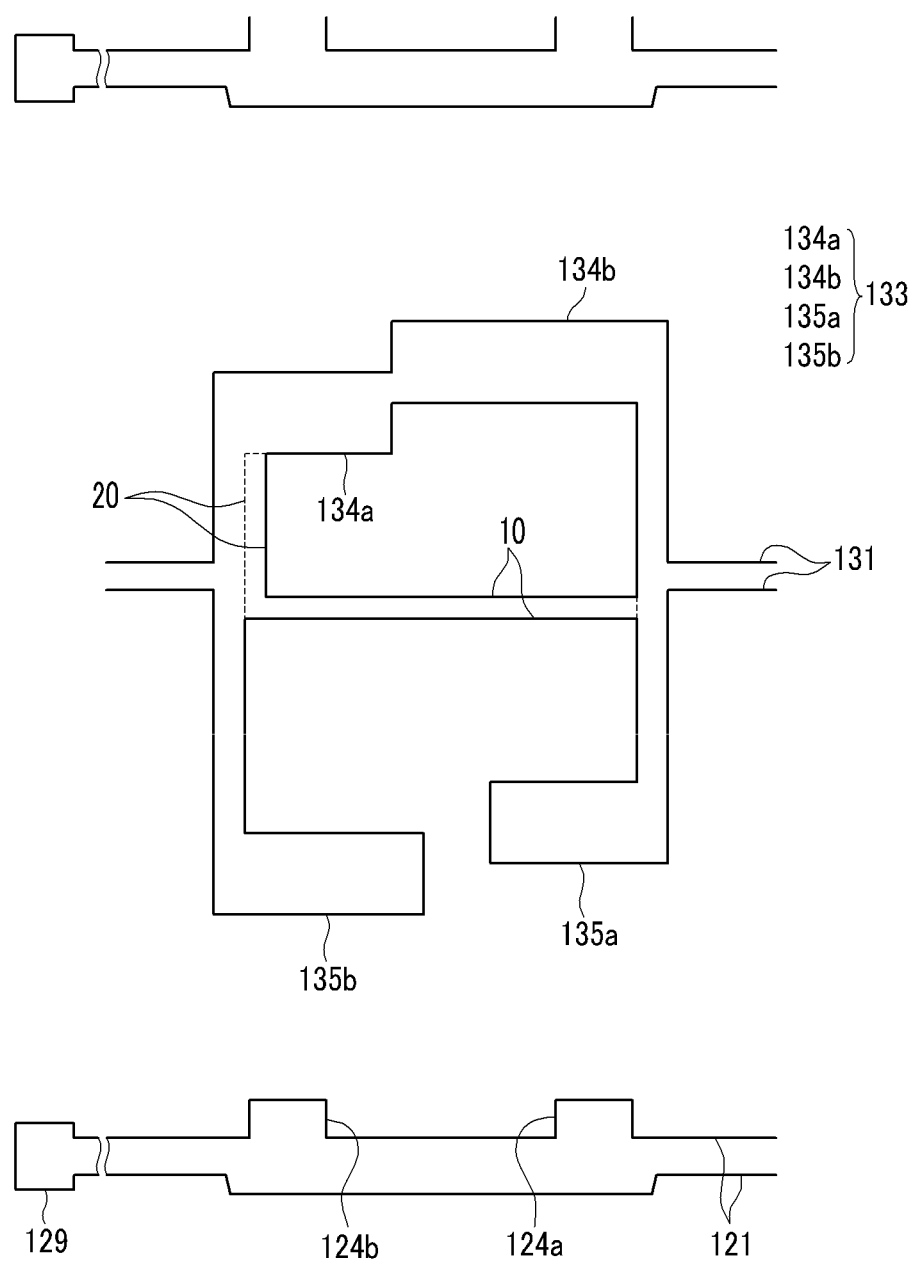
FIG. 15 is a layout view illustrating only a gate conductor part in a liquid crystal display according to yet another exemplary embodiment of the present invention.

FIG. 15 is a layout view illustrating only a gate conductor part in a liquid crystal display according to yet another exemplary embodiment of the present invention.

Referring to FIG. 15, a storage electrode line 131 includes shielding members 10 and 20. In FIG. 15, the third shielding member 30 is not formed unlike FIG. 13. Unlike FIG. 15, the storage electrode line 131 may have the second shielding member 20 extending from the light side of an lower light region D3a of a first subpixel electrode 191a.

The first subpixel electrode having a roughly quandrangular shape as a whole and the pixel electrode surrounding the first subpixel electrode have been described so far. Hereinafter, an example of applying an exemplary embodiment of the present invention to a pixel electrode having a different structure will be described.

Figure 16:
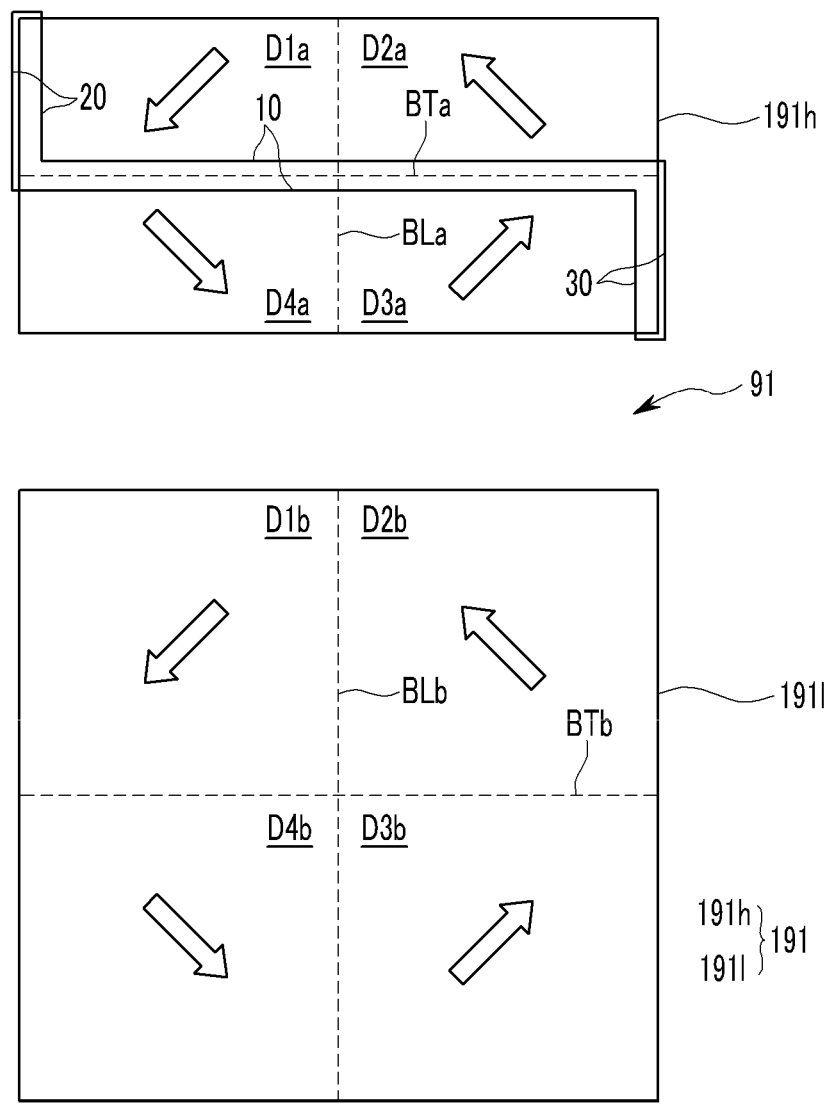
FIG. 16 is a layout view illustrating only a pixel electrode and a shielding member in a liquid crystal display according to yet another exemplary embodiment of the present invention.

FIG. 16 is a layout view illustrating only a pixel electrode and a shielding member in a liquid crystal display according to yet another exemplary embodiment of the present invention.

Referring to FIG. 16, the pixel electrode 191 includes first and second subpixel electrodes 191h and 191l separated from each other.

The overall shape of the pixel electrode 191 is a roughly rectangular shape elongated in a vertical direction, and the first subpixel electrode 191h and the second subpixel electrode 191l are separated from each other by a gap 91. Both of the first subpixel electrode 191h and the second subpixel electrode 191l have a roughly quadrangular shape as a whole, and the second subpixel electrode 191l is formed to be longer than the first subpixel electrode 191h in the vertical direction. The gap 91 is positioned between the first subpixel electrode 191h and the second subpixel electrode 191l.

The first subpixel electrode 191h is divided into four regions of upper left, upper right, lower right and lower left regions D1a to D4a by a transverse base line BTa and a longitudinal base line BLa, and the second subpixel electrode 191l is also divided into four regions of upper left, upper right, lower right and lower left regions D1b to D4b by a transverse base line BTb and a longitudinal base line BLb.

Shielding members 10, 20, and 30 include a first shielding member 10, a second shielding member 20 and a third shielding member 30. The shielding members 10, 20, and 30 overlap the first subpixel electrode 191h.

The first shielding member 10 is formed along the transverse line BTa of the first subpixel electrode 191h. The second and third shielding members 20 and 30 are formed in a direction intersecting the direction in which the first shielding member 10 is formed. For example, when the first shielding member 10 is formed in the x-direction, the second and third shielding members 20 and 30 are formed in the y-direction. The second shielding member 20 is formed along a left edge within the upper left region D1a of the first subpixel electrode 191h, and the third shielding member 30 is formed along a right edge within the lower right region D3a of the first subpixel electrode 191h. The positions where the second and third shielding members 20 and 30 are formed are determined on the basis of liquid crystal alignment directions.

In FIG. 16, the liquid crystal alignment directions are a lower left direction in the upper left regions D1a and D1b of the first and second subpixel electrodes 191h and 191l, an upper left direction in the upper right regions D2a and D2b, an upper right direction in the lower right regions D3*a* and D3*b*, and a lower right direction in the lower left regions D4*a* and D4*b*. That is, alignment directions of liquid crystal molecules, as shown in FIG. 6C, are formed in the first subpixel electrode 191*h* and the second subpixel electrode 191*l*, respectively. However, since the area ratio between the first subpixel electrode 191*h* and the second subpixel electrode 191*l* is not 1:1, two kinds of first masks (M1 of FIG. 4A) are required in order to form the liquid crystal alignment directions, as shown in FIG. 6A, in the first subpixel electrode 191*h* and the second subpixel electrode 191*l*, respectively. This is because the different areas of the first subpixel electrode 191*h* and the second subpixel electrode 191*l* make it impossible to shift one kind of first mask (M1 of FIG. 4A) for use on both the first subpixel electrode 191*h* and the second subpixel electrode 191*l*.

Figure 17:
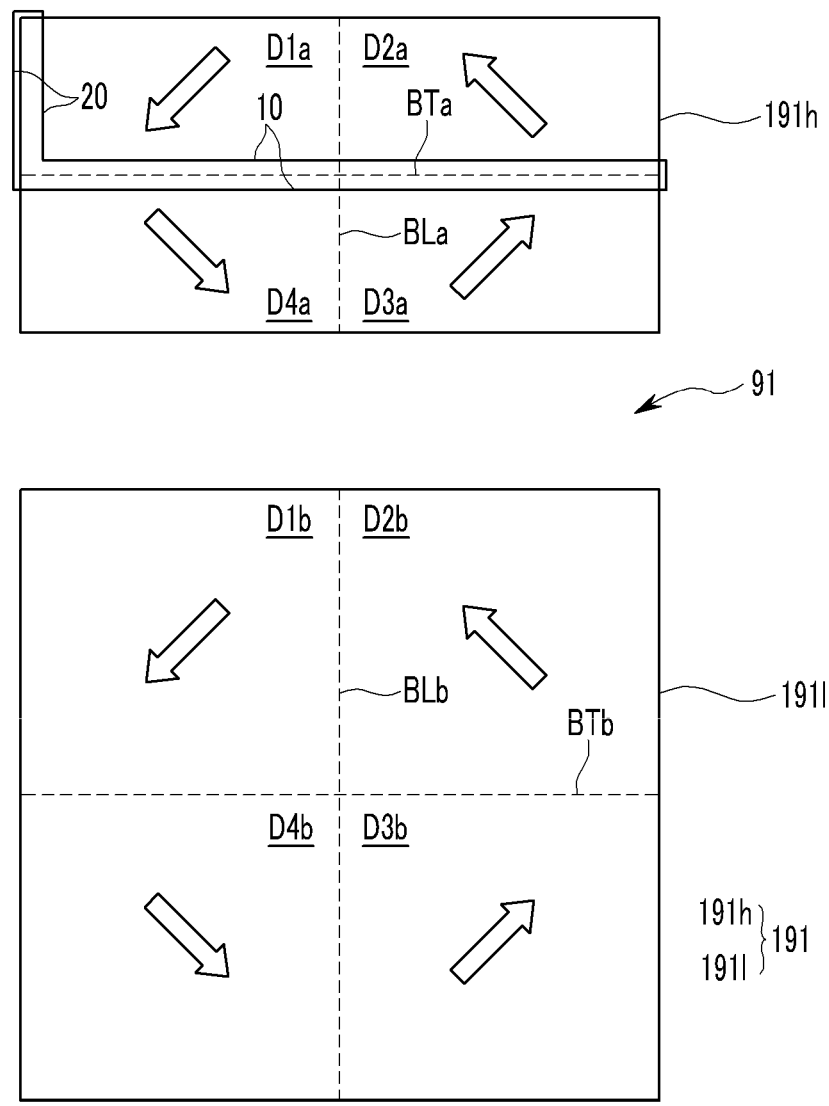
FIG. 17 is a layout view illustrating only a pixel electrode and a shielding member in a liquid crystal display according to yet another exemplary embodiment of the present invention.

Even when the area ratio between the first subpixel electrode 191*h* and the second subpixel electrode 191*l* is 1:1, the kind and number of first masks (M1 of FIG. 4A) may be varied depending on whether or not the gap 91 between the first subpixel electrode 191*h* and the second subpixel electrode 191*l* is exposed. FIG. 17 is a layout view illustrating only a pixel electrode and a shielding member in a liquid crystal display according to yet another exemplary embodiment of the present invention.

Referring to FIG. 17, shielding members 10 and 20 include only a first shielding member 10 and a second shielding member 20. Unlike FIG. 16, the third shielding member 30 is not formed. Unlike FIG. 17, the second shielding member 20 may be formed at the right side of the lower right region D3*a*, rather than being formed at the left side of the upper left region D1*a* of the first subpixel electrode 191*h*.

As in the cases of FIG. 1 and FIG. 10, even in the case of FIG. 16 and FIG. 17, both of the pixel electrode 191 of FIG. 16 and the pixel electrode 191 of FIG. 17 may be pixel electrodes within a single crystal display. Particularly, the pixel electrode 191 of FIG. 16 may be a pixel electrode corresponding to blue, and the pixel electrode 191 of FIG. 17 may be a pixel electrode corresponding to red and/or green.

Figure 18:
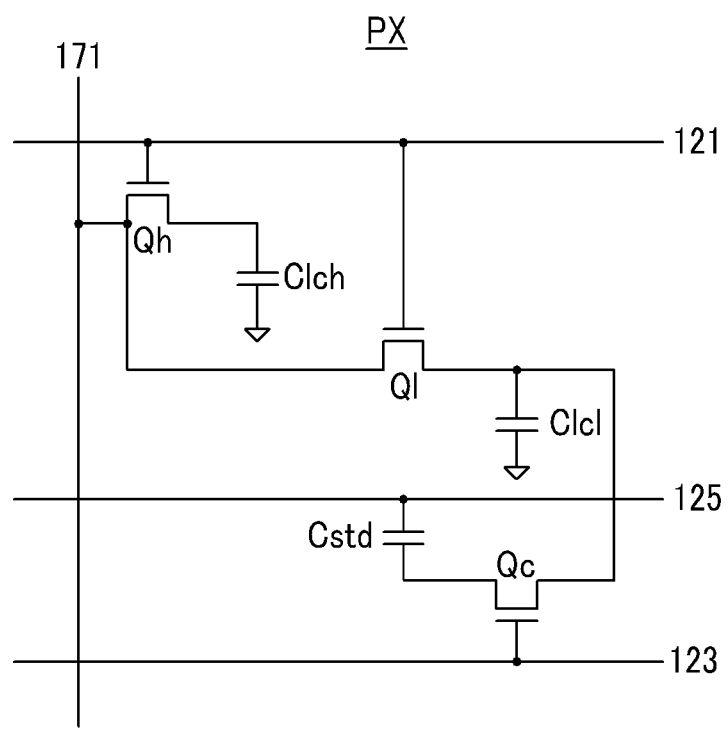
FIG. 18 is an equivalent circuit diagram with respect to a single pixel in a liquid crystal display according to yet another exemplary embodiment of the present invention.
Figure 19:
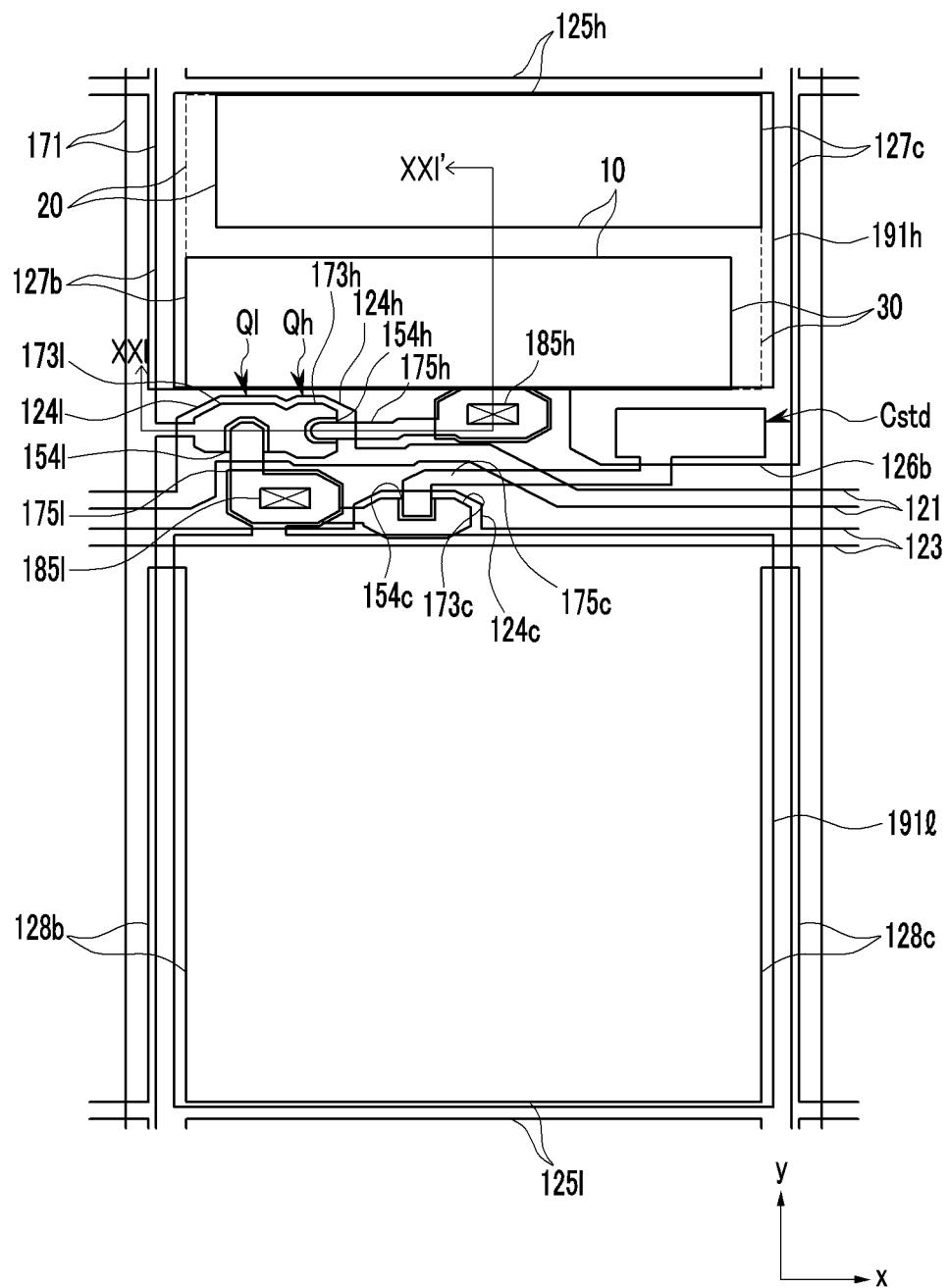
FIG. 19 is a layout view of a liquid crystal display according to yet another exemplary embodiment of the present invention.
Figure 20:
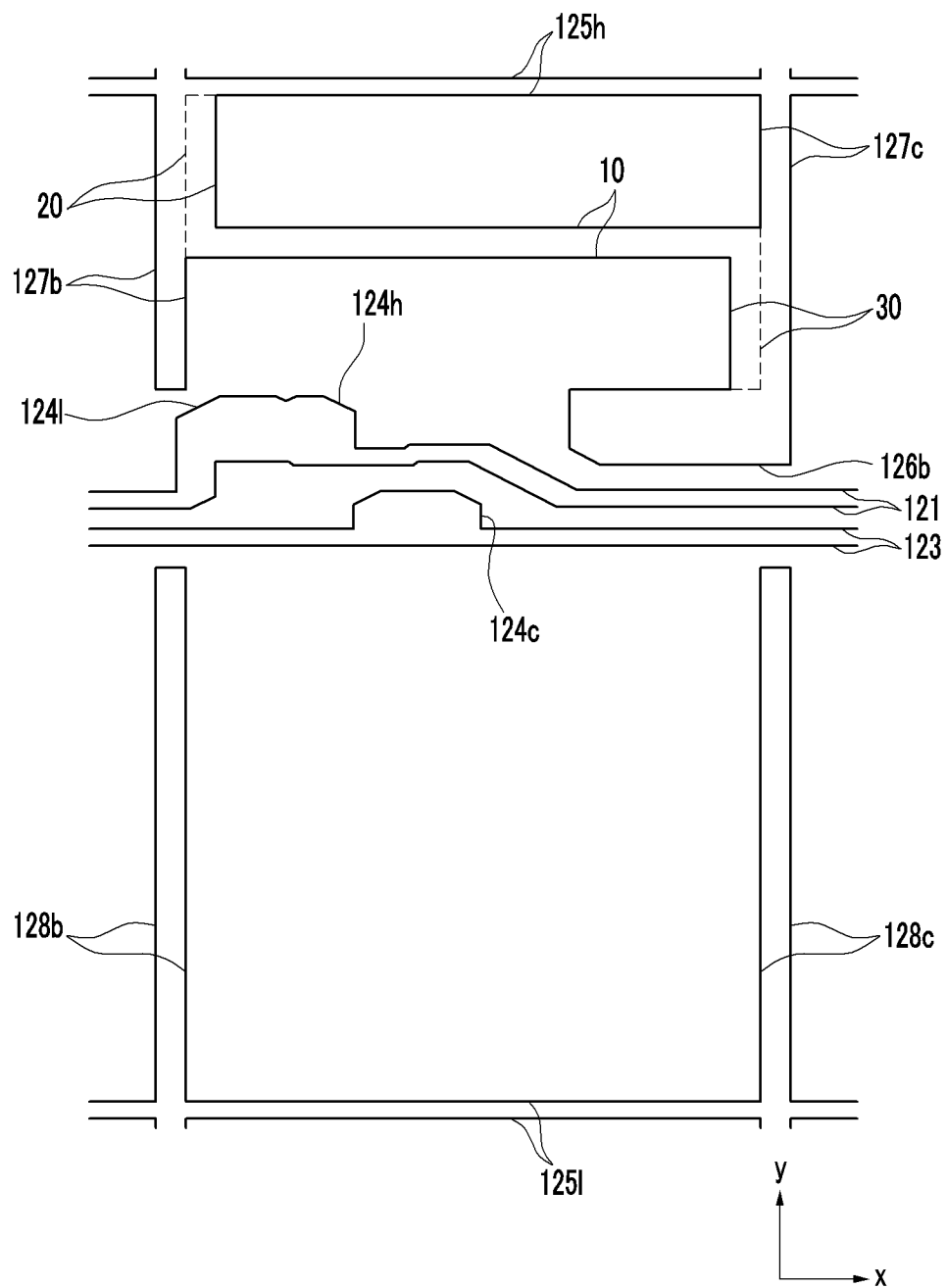
FIG. 20 is a layout view illustrating only a gate conductor part in the liquid crystal display of FIG. 19.
Figure 21:
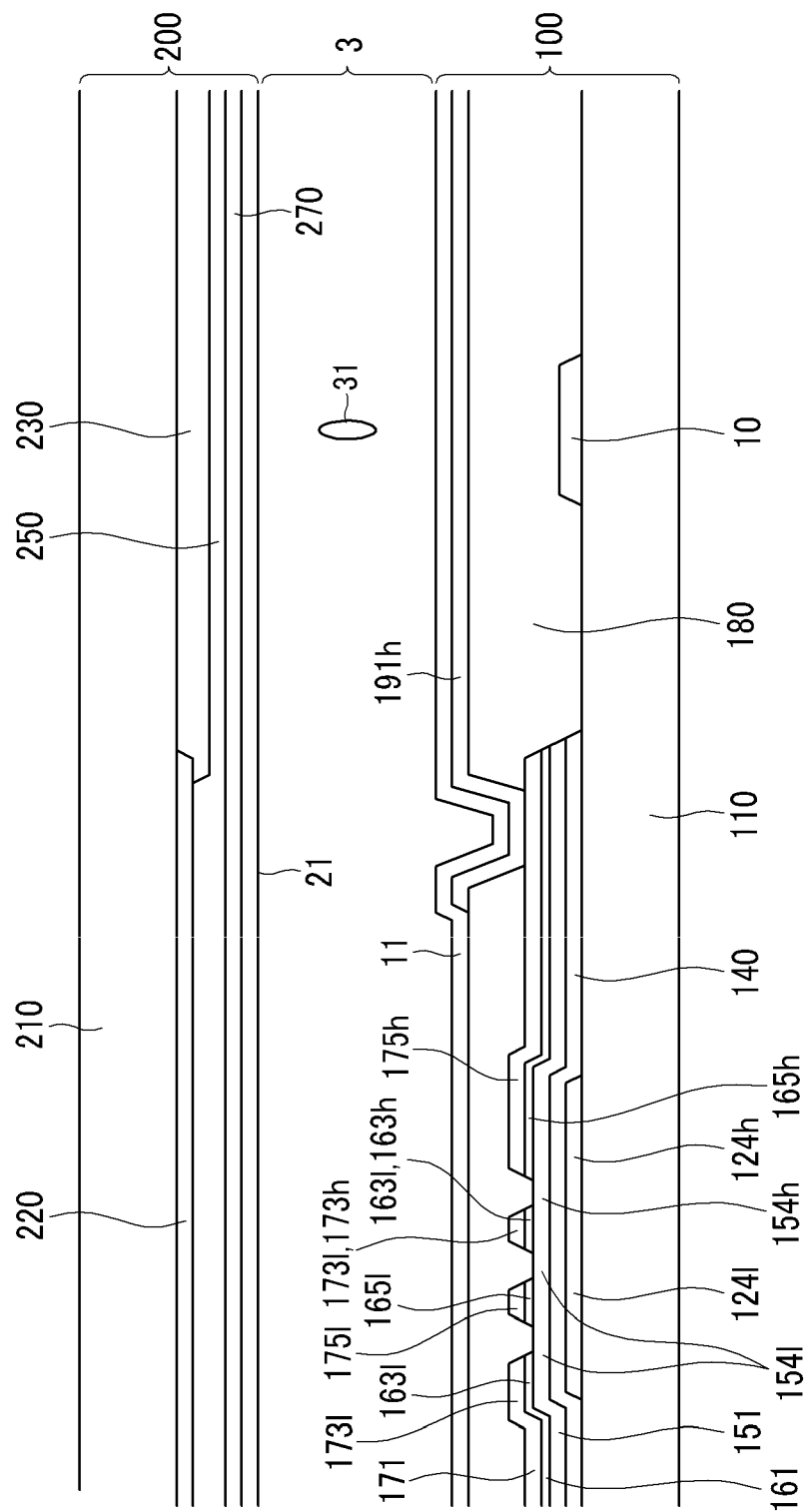
FIG. 21 is a cross-sectional view taken along line XXI-XXI' of the liquid crystal display of FIG. 19.

FIG. 18 is an equivalent circuit diagram for a single pixel in a liquid crystal display according to yet another exemplary embodiment of the present invention, FIG. 19 is a layout view illustrating a liquid crystal display according to yet another exemplary embodiment of the present invention, FIG. 20 is a layout view illustrating only a gate conductor part in the liquid crystal display of FIG. 19, and FIG. 21 is a cross-sectional view taken along line XXI-XXI' of the liquid crystal display of FIG. 19.

Referring to FIG. 18, the liquid crystal display includes signal lines including a first gate line 121, a second gate line 123, a common voltage line 125 and a data line 171, and a plurality of pixels PX connected to the same.

A pixel PX includes a first switching element Qh, a second switching element Ql, a third switching element Qc, a first liquid crystal capacitor Clch, a second liquid crystal capacitor Clcl, and a transformer capacitor Cstd.

The first switching element Qh and the second switching element Ql are three-terminal elements such as thin film transistors or the like provided in the lower display panel 100, and include control terminals connected to the first gate line 121, input terminals connected to the data line 171, and output terminals connected to the first liquid crystal capacitor Clch and the second liquid crystal capacitor Clcl, respectively.

The third switching element Qc is also a three-terminal element such as a thin film transistor or the like provided in the lower display panel 100, and includes a control terminal connected to the second gate line 123, an input terminal connected to the second liquid crystal capacitor Clcl, and an output terminal connected to the transformer capacitor Cstd.

The transformer capacitor Cstd is connected to the output terminal of the third switching element Qc and the common voltage line 125 and configured as the common voltage line 125 provided in the lower display panel 100 and the output terminal of the third switching element Qc overlap each other while having an insulator placed therebetween.

When a gate-on voltage (Von) is applied to the first gate line 121, the first switching element Qh and the second switching element Ql connected to the first gate line 121 are turned on. Accordingly, the same data voltage of the data line 171 is applied to the first and second subpixel electrodes 191*h* and 191*l* through the turned-on first and second switching elements Qh and Ql. Because the first and second liquid crystal capacitors Clch and Clcl are charged by the difference in voltage between a common voltage Vcom of the common electrode 270 and the voltage of the first and second subpixel electrodes 191*h* and 191*l*, the charged voltage of the first liquid crystal capacitor Clch and the charged voltage of the second liquid crystal capacitor Clcl are also identical to each other. In this case, a gate-off voltage (Voff) is applied to the second gate line 123.

In the case where a gate-on voltage (Von) is applied to the second gate line 123 when or after a gate-off voltage (Voff) is applied to the next first gate line 121, the first and second switching elements Qh and Ql connected to the first gate line 121 are turned off and the third switching element Qc is turned on. Accordingly, charges of the second subpixel electrode 191*l* connected to the output terminal of the second switching element Ql flow into the transformer capacitor Cstd, thereby dropping the voltage of the second liquid crystal capacitor Clcl.

As described above, the first subpixel electrode 191*h* is configured to be supplied with a first data voltage, and the second subpixel electrode 191*l* is configured to be applied with the second data voltage lower than the first data voltage.

Referring to FIG. 19 to FIG. 21, the liquid crystal display includes a lower display panel 100 and an upper display panel 200 facing each other, and a liquid crystal layer 3 interposed between the two display panels 100 and 200. A polarizer (not shown) may be provided on the outer surface of each of the display panels 100 and 200.

First, the lower display panel 100 will be described.

A plurality of gate conductors including a plurality of first gate lines 121, a plurality of second gate lines 123 and a common voltage line 125 are formed on a first substrate 110.

The first gate line 121 and the second gate line 123 extend chiefly in a horizontal direction and transmit a gate signal. The first gate line 121 and the second gate line 123 are formed slightly above the transverse center of a pixel. The first gate line 121 includes a first gate electrode 124*h* and a second gate electrode 124*l* protruding toward a first subpixel electrode 191*h*, and the second gate line 123 includes a third gate electrode 124 protruding in the same direction. The first gate electrode 124*h* and the second gate electrode 124*l* are connected to each other to thereby constitute a single protruding portion.

The common voltage line 125 extends in the x-direction and transmits a fixed voltage such as a common voltage Vcom. The common voltage line 125 includes an upper transverse line 125*h* formed above the first gate line 121 and the second gate line 123 and a lower transverse line 125*l* formed below the first gate line 121 and the second gate line 123.

The upper transverse line 125*h* includes left and right common voltage electrodes 127*b* and 127*c* protruding below the upper transverse line 125*h*, an extension portion 126*b* connected to an end portion of the right common voltage electrode 127c, and shielding members 10, 20, and 30.

The shielding members 10, 20, and 30 have the same shape as described with reference to FIG. 16. The second shielding member 20 is an extension of the left common voltage electrode 127b above the shielding member 10, and the third shielding member 30 is an extension of the right common voltage electrode 127c below the shielding member 10.

The lower transverse line 125l includes left and right common voltage electrodes 128b and 128c protruding toward the first gate line 121.

A gate insulating layer 140 is formed on the gate conductors (121, 123, and 125).

A plurality of semiconductor stripes 151, which may be made of amorphous or crystalline silicon or the like, are formed on the gate insulating layer 140. The semiconductor stripes 151 extend in the y-direction and include first and second semiconductors 154h and 154l extending toward the first and second gate electrodes 124h and 124l and connected to each other, and a third semiconductor 154c connected to the second semiconductor 154l.

A plurality of ohmic contact stripes 161 are formed on the semiconductor stripe 151, a pair of ohmic contacts 163h and 165ha are formed on the first semiconductor 154h, and a pair of ohmic contacts 163l and 165l are formed on the second semiconductor 154l. A pair of ohmic contacts (not shown) are formed on the third semiconductor 154c. The ohmic contacts 163l and 163h are connected to the ohmic contact stripe 161.

Data conductors including a plurality of data lines 171, a plurality of first drain electrodes 175h, a plurality of second drain electrodes 175l, a plurality of third source electrodes 173c and a plurality of third drain electrodes 175c are formed on the ohmic contacts 161, 165h and 165l.

The data lines 171 transmit a data signal and extend chiefly in a vertical direction to intersect the first gate line 121 and the second gate line 123. Each data line 171 includes a first source electrode 173h and a second source electrode 173l extending toward the first gate electrode 124h and the second gate electrode 124l. The first source electrode 173h and the second source electrode 173l are connected to each other.

The first drain electrode 175h, the second drain electrode 175l and the third drain electrode 175c each include one enlarged end portion and one bar-shaped end portion. The bar-shaped end portions of the first drain electrode 175h and the second drain electrode 175l are partially surrounded by the first source electrode 173h and the second source electrode 173l, respectively, and the third source electrode 173c is also partially surrounded by the third source electrode 173c. The enlarged end portion of the second drain electrode 175l is connected to the third source electrode 173c. The enlarged end portion 177c of the third drain electrode 175c overlaps the extension portion 126b of the common voltage line 125 to thereby constitute a transformer capacitor Cstd.

The first/second/third gate electrode 124h/124l/124c, the first/second/third source electrode 173h/173l/173c and the first/second/third drain electrode 175h/175l/175c constitute a single first/second/third thin film transistor (TFT) Qh/Ql/Qc, together with the first/second/third semiconductor 154h/154l/154c, and a channel of the thin film transistor is formed in the semiconductor 154h/154l/154c between the source electrode 173h/173l/173c and the drain electrode 175h/175l/175c.

The semiconductor stripe 151 including the semiconductors 154h, 154l, and 154c has substantially the same plane shape as the ohmic contacts 161, 165h and 165l thereunder, except for channel regions between the source electrodes 173h, 173l, and 173c and the drain electrodes 175h, 175l, and 175c. That is, the semiconductor stripe 151 including the semiconductors 154h, 154l, and 154c has exposed portions which are not covered with the data conductors 171, 175h, 175l and 175c, as well as the spaces between the source electrodes 173h, 173l, and 173c and the drain electrodes 175h, 175l, and 175c.

A passivation layer 180 is formed on the data conductors 171, 175h, 175l and 175c and the exposed portions of the semiconductors 154h, 154l, and 154c.

The passivation layer 180 has a plurality of contact holes 185h and 185l exposing the enlarged end portion of the first drain electrode 175h and the enlarged end portion of the second drain electrode 175l, respectively.

A pixel electrode 191 is formed on the passivation layer 180.

The pixel electrode 191 has a roughly quadrangular shape as a whole, and includes first and second subpixel electrodes 191h and 191l separated from each other with a gap 91 (see FIG. 16) interposed therebetween. Each of the first and second subpixel electrodes 191h and 191l has a roughly quadrangular shape, and the first subpixel electrode 191h is placed above the second subpixel electrode 191l.

The first subpixel electrode 191h is supplied with a data voltage from the first drain electrode 175h through the contact hole 185h, and the second subpixel electrode 191l is supplied with a data voltage from the second drain electrode 175l through a protruding portion 192l and the contact hole 185l.

An alignment layer 11 is formed on the first and second subpixel electrodes 191h and 191l and the passivation layer 180. The alignment layer 11 may be a vertical alignment layer.

Hereinafter, the upper display panel 200 will be described.

A plurality of color filters 230 and a light blocking member 220 called a black matrix are formed on the second substrate 210, and an overcoat layer 250 is formed on the light blocking member 220 and the plurality of color filters 230.

A common electrode 270, which may be made of a transparent conductor or a metal, such as indium tin oxide (ITO), indium zinc oxide (IZO) or the like is formed on the overcoat layer 250, and an alignment layer 21 may be formed thereon. The alignment layer 21 may be a vertical alignment layer.

The liquid crystal layer 3 interposed between the lower display panel 100 and the upper display panel 200 contains liquid crystal molecules having dielectric anisotropy, and the liquid crystal molecules may be aligned such that the longitudinal axes thereof are vertical with respect to the surfaces of the two display panels 100 and 200 when there is no electric field.

The first and second subpixel electrodes 191h and 191l supplied with the data voltage generate an electric field together with the common electrode 270 of the upper display panel 200, thereby determining a direction of the liquid crystal molecules of the liquid crystal layer 3 between the two electrodes 191 and 270. A degree of the polarization of light incident upon the liquid crystal layer 3 varies depending on a degree to which the liquid crystal molecules are inclined, and the variation in the polarization is realized as a variation in transmittance because of the polarizers, whereby the liquid crystal display displays an image.

The first subpixel electrode 191h and the common electrode 270 form a first liquid crystal capacitor Clch together with the liquid crystal layer 3 therebetween, and the second subpixel electrode 191l and the common electrode 270 form a second liquid crystal capacitor Clcl together with the liquid crystal layer 3 therebetween, thereby maintaining applied voltage even after the first and second thin film transistors Qh and Ql are turned off.

After the first and second thin film transistors Qh and Ql are turned off, the third thin film transistor Qc is turned on and thus the second liquid crystal capacitor Clcl is connected to the transformer capacitor Cstd, thereby dropping the voltage of the second liquid crystal capacitor Clcl. When the voltages of the first and second liquid crystal capacitors Clch and Clcl are different, a difference in luminance occurs, and lateral visibility can be improved by appropriately adjusting the voltages of the first and second liquid crystal capacitors Clch and Clcl. Various features and operations of the liquid crystal display, such as a method of forming shielding members according to liquid crystal alignment directions described above are also applicable to the present exemplary embodiment.

Figure 22:
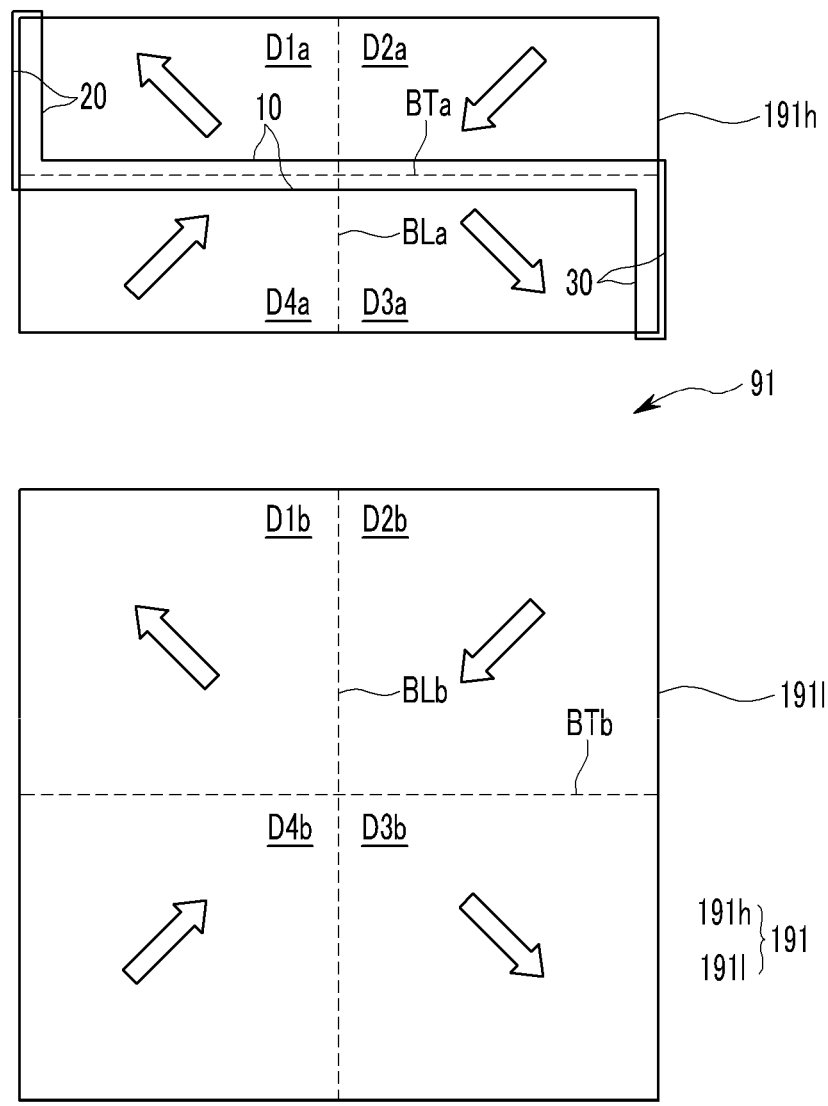
FIG. 22 to FIG. 24 are layout views each of which illustrates only a pixel electrode and a shielding member in a liquid crystal display having different liquid crystal alignment directions from those of FIG. 16.
Figure 23:
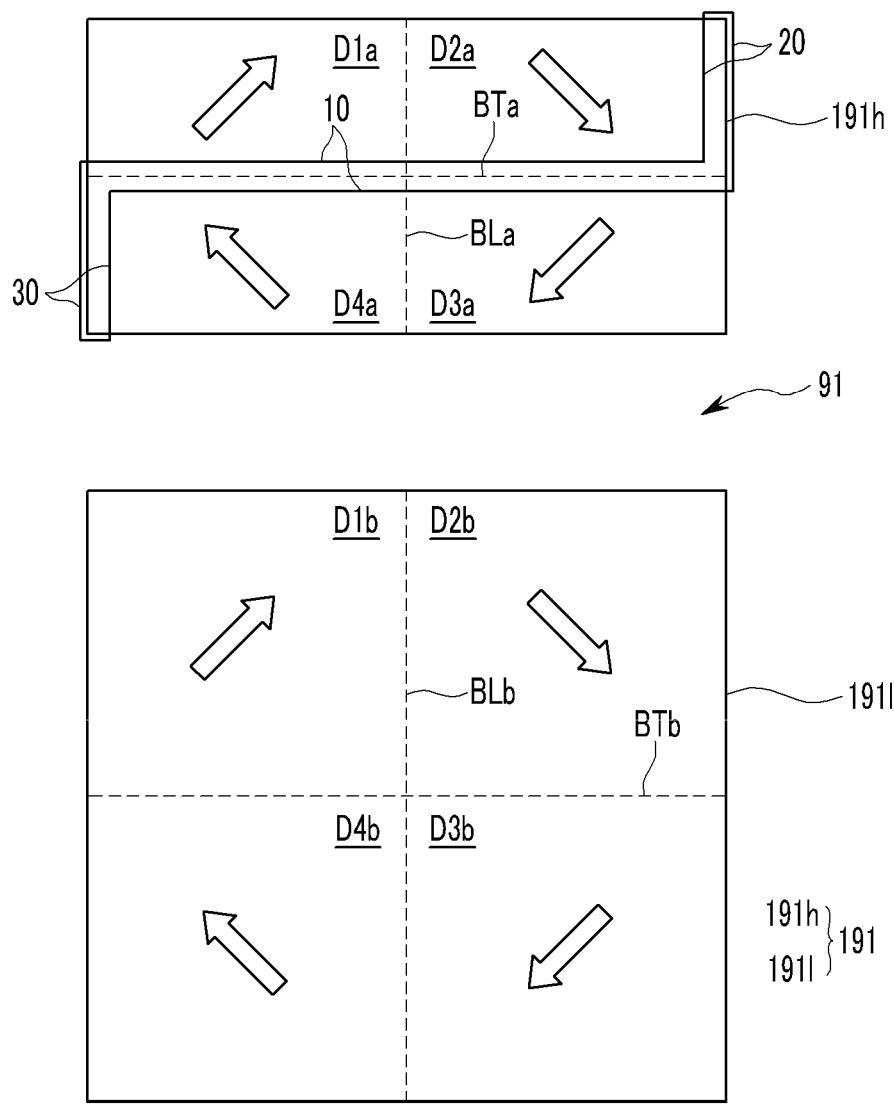
Figure 24:
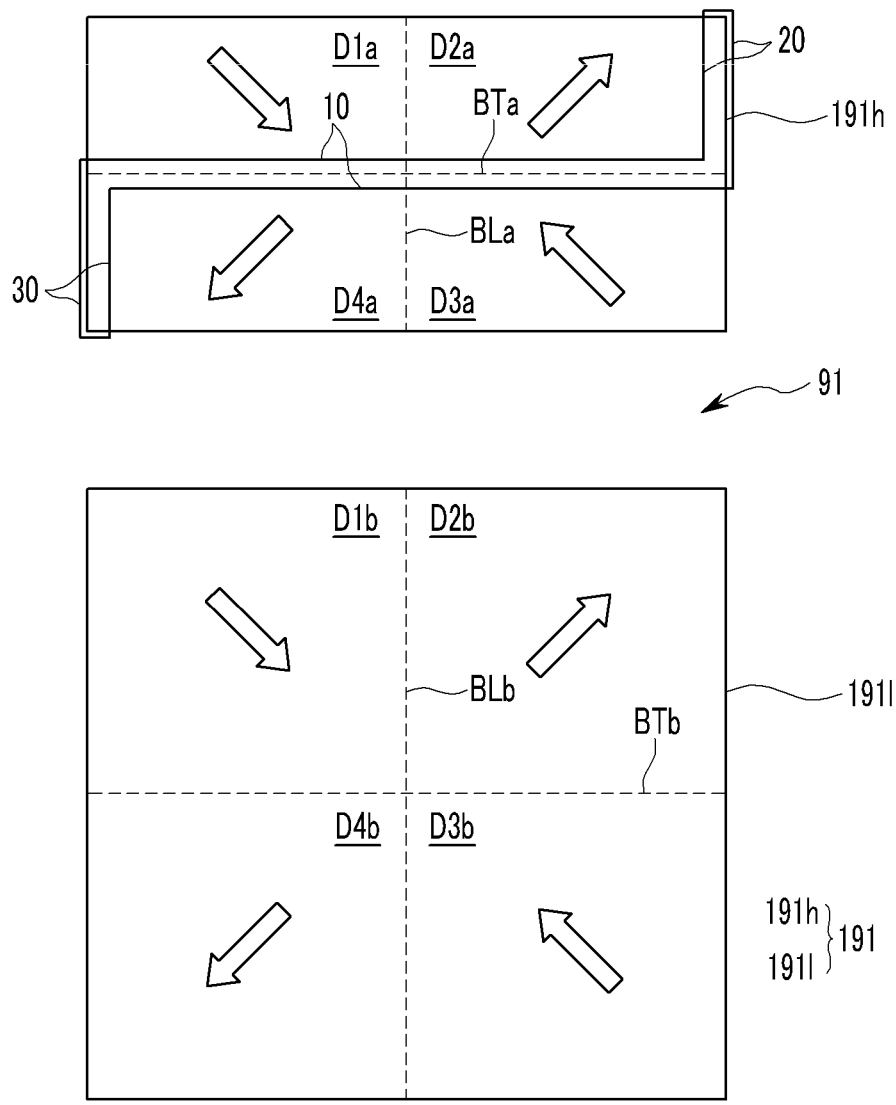

FIG. 22 to FIG. 24 are layout views each of which illustrates only a pixel electrode and a shielding member in a liquid crystal display having different liquid crystal alignment directions from those of FIG. 16.

Referring to FIG. 22, the liquid crystal alignment directions are an upper left direction in upper left regions D1a and D1b of the first and second subpixel electrodes 191h and 191l, a lower left direction in upper right regions D2a and D2b, a lower right direction in lower right regions D3a and D3b, and an upper right direction in lower left regions D4a and D4b.

When the liquid crystal display is viewed from the left or right side of the liquid crystal display, the portions from which the longitudinal axis of the liquid crystal is viewed among portions where textures are generated in FIG. 22 are the same as those of FIG. 16. That is, in the first subpixel electrode 191h, the portions where the longitudinal axis of the liquid crystal is viewed are the boundary between the upper left region D1a and the lower left region D4a, the boundary between the upper right region D2a and the lower right region D3a, the left side of the upper left region D1a, and the right side of the lower right region D3a.

Accordingly, the shapes of the shielding members 10, 20, and 30 are the same as those in FIG. 16.

Referring to FIG. 23, the liquid crystal alignment directions are an upper right direction in the upper left regions D1a and D1b of the first and second subpixel electrodes 191h and 191l, a lower right direction in the upper right regions D2a and D2b, a lower left direction in the lower right regions D3a and D3b, and an upper left direction in the lower left regions D4a and D4b.

When the liquid crystal display is viewed from the left or right side of the liquid crystal display, the portions where the longitudinal axis of the liquid crystal is viewed among portions where textures are generated in FIG. 23 are as follows.

In the first subpixel electrode 191h, the portions where the longitudinal axis of the liquid crystal is viewed are the boundary between the upper left region D1a and the lower left region D4a, the boundary between the upper right region D2a and the lower right region D3a, the right side of the upper right region D2a, and the left side of the lower left region D4a.

The first shielding member 10 is the same as that of FIG. 16, the second shielding member 20 is formed at the right side of the upper right region D2a, and the third shielding member 30 is formed at the left side of the lower left region D4a.

Referring to FIG. 24, the liquid crystal alignment directions are a lower right direction in the upper left regions D1a and D1b of the first and second subpixel electrodes 191h and 191l, an upper right direction in the upper right regions D2a and D2b, an upper left direction in the lower right regions D3a and D3b, and a lower left direction in the lower left regions D4a and D4b.

When the liquid crystal display is viewed from the left or right side of the liquid crystal display, the portions where the longitudinal axis of the liquid crystal is viewed among portion where textures are generated in FIG. 25 are the same as those of FIG. 24. That is, in the first subpixel electrode 191a, the portions where the longitudinal axis of the liquid crystal is viewed are the boundary between the upper left region D1a and the lower left region D4a, the boundary between the upper right region D2a and the lower right region D3a, the right side of the upper right region D2a, and the left side of the lower left region D4a. Accordingly, the shapes of the shielding members 10, 20, and 30 are the same as those of FIG. 24.

As in the case of FIG. 16 and FIG. 17, the shielding members of the pixel electrode of FIG. 22 to FIG. 24 may be shielding members of a pixel electrode corresponding to blue. In this case, shielding members of a pixel electrode corresponding to red and/or green may be formed to have a smaller area than those of FIG. 22 to FIG. 24.

In FIG. 16, FIG. 17, and FIG. 22 to FIG. 24, the liquid crystal alignment directions of the first subpixel electrode 191h are the same as the liquid crystal alignment directions of the second sub-pixel electrode 191l; however, this is just an example. That is, the liquid crystal alignment directions of the first subpixel electrode 191h may be different from those of the second subpixel electrode 191l.

In the manner described, the liquid crystal display capable of improving lateral visibility and preventing a yellowish effect can be provided.

Among a plurality of textures generated from the first subpixel electrode applied with a greater data voltage than the second subpixel electrode, only textures affecting lateral visibility can be covered by the shielding members. In such a manner, right and left lateral gammas can be rendered similar to the front gamma at a low gray level, thereby improving lateral visibility. Furthermore, when the first subpixel electrode is partially covered with the shielding members, primary efficiency may be degraded but secondary or tertiary efficiency is increased. Accordingly, transmittance is not significantly reduced.

Furthermore, the area of a shielding member of each of a plurality of pixel electrodes may vary depending on a color corresponding to each pixel electrode. A shielding member of a pixel electrode corresponding to blue may be formed to have a greater area than that of a shielding member of a pixel electrode corresponding to red/green, so that the yellowish effect can be prevented at an intermediate gray level.

While this invention has been described in connection with what is presently considered to be practical exemplary embodiments, it is to be understood that the invention is not limited to the disclosed embodiment and is intended to cover various modifications and equivalent arrangements included within the spirit and scope of the appended claims.

<Description of symbols>

| | | | |
|---|---|---|---|
| 10, 20, 30: | Shielding member | 11, 21: | Alignment layer |
| 100, 200: | Lower display panel, Upper panel | 110, 210: | Substrate |
| 121: | Gate line | 131: | Storage electrode line |
| 140: | Gate insulating layer | 151: | Semiconductor stripe |
| 160: | Blocking layer | 171: | Data line |
| 180: | Passivation layer | 191: | Pixel electrode |
| 191a, 191h: | First subpixel electrode | 191b, 191l: | Second subpixel electrode |
| 220: | Light blocking member | 230: | Color filter |
| 250: | Overcoat layer | 270: | Common electrode |
| 91: | Gap | | |

What is claimed is:

1. A liquid crystal display, comprising:
a first substrate and a second substrate facing each other;
a plurality of pixel electrodes formed on the first substrate and each including a first subpixel electrode and a second subpixel electrode;
a common electrode formed on the second substrate;
a shielding member formed on the first substrate or the second substrate and overlapping a portion of the first subpixel electrode, wherein a dimension of the shielding member varies according to the color that is represented by the subpixel electrode;
an alignment layer formed on at least one of the plurality of pixel electrodes and the common electrode and subjected to photo-alignment; and
a liquid crystal layer interposed between the first substrate and the second substrate,
wherein the first subpixel electrode is formed to be supplied with a first data voltage, and the second subpixel electrode is formed to be supplied with a second data voltage smaller than the first data voltage.

2. The liquid crystal display of claim 1, wherein:
the shielding member includes a first shielding member formed substantially along a transverse base line that divides the first subpixel electrode into two parts.

3. The liquid crystal display of claim 2, wherein:
the shielding member further includes a second shielding member formed along at least one of a left edge and a right edge of the first subpixel electrode.

4. The liquid crystal display of claim 3, wherein:
the liquid crystal layer includes a first liquid crystal layer positioned between the first subpixel electrode and the common electrode, and
the first liquid crystal layer includes four domains aligned in an upper left direction, a lower left direction, an upper right direction and a lower right direction.

5. The liquid crystal display of claim 4, wherein:
the first subpixel electrode is divided into four regions of an upper left region, an upper right region, a lower right region and a lower left region by the transverse base line and a longitudinal base line, and
the four regions correspond to the four domains, respectively.

6. The liquid crystal display of claim 4, wherein:
a transverse domain boundary texture (DBT) is generated in the vicinity of the transverse base line of the first subpixel electrode, and a longitudinal DBT is generated in the vicinity of a longitudinal base line of the first subpixel electrode.

7. The liquid crystal display of claim 6, wherein:
the first shielding member covers the transverse DBT.

8. The liquid crystal display of claim 7, wherein:
upper and lower fringe field textures (FFT) are generated in the vicinity of an upper edge and a lower edge of the first subpixel electrode, respectively, and left and right FFTs are generated in the vicinity of a left edge and a right edge of the first subpixel electrode, respectively.

9. The liquid crystal display of claim 8, wherein:
the second shielding member covers at least one FFT of the left FFT and the right FFT.

10. The liquid crystal display of claim 4, wherein:
the second shielding member is formed in at least one domain of the four domains.

11. The liquid crystal display of claim 10, wherein:
when an electric field is formed between the first subpixel electrode and the common electrode,
a direction in which the first liquid crystal layer is aligned at an edge of the first subpixel electrode within the at least one domain by the electric field is different from a liquid crystal alignment direction of the at least one domain.

12. The liquid crystal display of claim 10, wherein:
the second shielding member overlapping the first subpixel electrode of a first pixel electrode, which is one of the plurality of pixel electrodes, is formed in a first domain of the four domains, and
the second shielding member overlapping the first subpixel electrode of a second pixel electrode, which is another one of the plurality of pixel electrodes, is formed within the first domain and a second domain among the four domains.

13. The liquid crystal display of claim 12, wherein:
when an electric field is formed between the first subpixel electrode and the common electrode,
directions in which the first liquid crystal layer is aligned at an edge of the first subpixel electrode within the first domain and the second domain by the electric field are different from liquid crystal alignment directions of the first domain and the second domain, respectively.

14. The liquid crystal display of claim 12, wherein:
the first domain and the second domain have no planes opposing each other.

15. The liquid crystal display of claim 12, wherein:
each of the plurality of pixel electrodes corresponds to any one of red (R), green (G) and blue (B), and
the second pixel electrode is a pixel electrode corresponding to blue.

16. The liquid crystal display of claim 4, wherein:
the plurality of domains are formed by irradiating light upon the alignment layer in different directions.

17. The liquid crystal display of claim 1, wherein:
each of the plurality of pixel electrodes corresponds to any one of red, green and blue, and
the shielding member overlapping the pixel electrode corresponding to blue has a greater area than the shielding members overlapping the pixel electrodes corresponding to red and green.

18. The liquid crystal display of claim 1, wherein:
the first subpixel electrode and the second subpixel electrode are separated from each other by a gap.

19. The liquid crystal display of claim 18, wherein:
the second subpixel electrode is positioned above and below the first subpixel electrode, with the first subpixel electrode as a center.

20. The liquid crystal display of claim 19, wherein:
the second subpixel electrode surrounds the first subpixel electrode.

21. The liquid crystal display of claim 1, further comprising:
a first thin film transistor connected to the first subpixel electrode;
a second thin film transistor connected to the second subpixel electrode;
a gate line connected to the first thin film transistor and the second thin film transistor; and
a data line intersecting the gate line,
wherein the shielding member is formed on the same layer as the gate line or the data line.

22. The liquid crystal display of claim 21, further comprising:
a storage electrode line formed on the same layer as the gate line, wherein the shielding member is connected to the storage electrode line.

23. The liquid crystal display of claim 1, further comprising:
a light blocking member formed on at least one of the first substrate and the second substrate,
wherein the shielding member is formed on the same layer as the light blocking member.

24. The liquid crystal display of claim 1, wherein:
the alignment layer includes a first alignment layer formed on the first substrate and a second alignment layer formed on the second substrate,
the first alignment layer includes a first portion onto which light is irradiated in a first direction, and a second portion onto which light is irradiated in a second direction opposite to the first direction, and
the second alignment layer includes a third portion onto which light is irradiated in a third direction intersecting the first direction, and a fourth portion onto which light is irradiated in a fourth direction opposite to the third direction.

25. A liquid crystal display, comprising:
a pixel electrode including first and second subpixel electrodes;
a common electrode facing the pixel electrode;
a first liquid crystal layer interposed between the first subpixel electrode and the common electrode and including a plurality of domains aligned in an upper left direction, a lower left direction, an upper right direction and a lower right direction;
a second liquid crystal layer interposed between the second subpixel electrode and the common electrode; and
a shielding member formed under the pixel electrode or the common electrode and overlapping the first subpixel electrode, wherein a dimension of the shielding member varies according to the color that is represented by the subpixel electrode, and
wherein the first subpixel electrode is formed to be supplied with a first data voltage, and the second subpixel electrode is formed to be supplied with a second data voltage smaller than the first data voltage.

26. The liquid crystal display of claim 25, wherein:
the first subpixel electrode is divided into upper left, upper right, lower right and lower left regions, and
the plurality of domains are formed in a lower left direction in the upper left region, an upper left direction in the upper right region, an upper right direction in the lower right region, and a lower right direction in the lower left region.

27. The liquid crystal display of claim 26, wherein:
the shielding member includes:
a first shielding member overlapping a boundary between the upper left region and the lower left region and a boundary between the upper right region and the lower right region;
a second shielding member formed at a left side of the upper left region; and
a third shielding member formed at a right side of the lower right region.

28. The liquid crystal display of claim 25, wherein:
the pixel electrode is formed to correspond to one color filter of a red filter, a green filter and a blue filter, and
an area of the shielding member is determined according to the color filter corresponding to the pixel electrode.

29. The liquid crystal display of claim 28, wherein:
an area of the shielding member of the pixel electrode that corresponds to the blue filter is greater than an area of the shielding member of the pixel electrode corresponding to the green filter or the red filter.

* * * * *